US012756768B2

(12) United States Patent
Alam et al.

(10) Patent No.: US 12,756,768 B2
(45) Date of Patent: Oct. 6, 2026

(54) IN-FLIGHT INCREMENTAL PROCESSING

(71) Applicant: Intel Corporation, Santa Clara, CA (US)

(72) Inventors: S M Iftekharul Alam, Hillsboro, OR (US); Satish Chandra Jha, Portland, OR (US); Vesh Raj Sharma Banjade, Portland, OR (US); Francesc Guim Bernat, Barcelona (ES); Kshitij Arun Doshi, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 18/090,862

(22) Filed: Dec. 29, 2022

(65) Prior Publication Data

US 2023/0137879 A1 May 4, 2023

Related U.S. Application Data

(60) Provisional application No. 63/425,857, filed on Nov. 16, 2022.

(51) Int. Cl.
*H04L 67/63* (2022.01)
*G06F 9/30* (2018.01)
(Continued)

(52) U.S. Cl.
CPC ............ *H04L 67/63* (2022.05); *G06F 9/3005* (2013.01); *G06F 9/3885* (2013.01);
(Continued)

(58) Field of Classification Search
CPC ......... H04L 67/63; H04L 63/12; H04L 67/10; H04L 63/0876; H04L 67/1091;
(Continued)

(56) References Cited

U.S. PATENT DOCUMENTS 7,065,764 B1 6/2006 Prael et al.
7,716,336 B2 5/2010 Coppinger et al.
(Continued)

OTHER PUBLICATIONS

Hu, Shuihai, "Deadlocks in Datacenter Networks: Why Do They Form, and How to Avoid Them", HotNets-XV, (Nov. 2016), 7 pgs.
(Continued)

*Primary Examiner* — Oleg Survillo
(74) *Attorney, Agent, or Firm* — Schwegman Lundberg & Woessner, P.A.

(57) ABSTRACT

Various approaches for deploying and controlling distributed compute operations with the use of infrastructure processing units (IPUs) and similar networked processing units are disclosed. For example, a payload may be received at a networking infrastructure device. Here, the payload is part of a workload that is routed through the networking infrastructure device from a first network node to a second network node. The networking infrastructure device may obtain a workload graph for the workload with vertices of the workload graph specifying functions. The networking infrastructure device may apply a function to the payload in accordance with the workload graph to transform the payload into a processed payload. The processed payload may be transmitted towards the second network node.

20 Claims, 12 Drawing Sheets

(51) Int. Cl.

| | |
|---|---|
| ***G06F 9/38*** | (2018.01) |
| ***G06F 9/48*** | (2006.01) |
| ***G06F 9/50*** | (2006.01) |
| ***G06F 9/54*** | (2006.01) |
| ***G06F 11/07*** | (2006.01) |
| ***G06F 12/0846*** | (2016.01) |
| ***G06F 12/0873*** | (2016.01) |
| ***H04L 9/40*** | (2022.01) |
| ***H04L 67/10*** | (2022.01) |
| ***H04L 67/1087*** | (2022.01) |
| ***H04L 67/12*** | (2022.01) |
| *H04L 41/5003* | (2022.01) |

(52) U.S. Cl.
CPC .......... *G06F 9/4881* (2013.01); *G06F 9/5038* (2013.01); *G06F 9/505* (2013.01); *G06F 9/5072* (2013.01); *G06F 9/5077* (2013.01); *G06F 9/5083* (2013.01); *G06F 9/54* (2013.01); *G06F 11/0793* (2013.01); *G06F 12/0851* (2013.01); *G06F 12/0873* (2013.01); *H04L 63/0876* (2013.01); *H04L 63/12* (2013.01); *H04L 67/10* (2013.01); *H04L 67/1091* (2013.01); *H04L 67/12* (2013.01); *H04L 41/5003* (2013.01)

(58) Field of Classification Search
CPC . H04L 67/12; H04L 41/5003; H04L 67/1097; H04L 41/0889; G06F 9/3005; G06F 9/3885; G06F 9/4881; G06F 9/5038; G06F 9/505; G06F 9/5072; G06F 9/5077; G06F 9/5083; G06F 9/54; G06F 11/0793; G06F 12/0851; G06F 12/0873; G06F 9/5044; G06F 9/5066; Y02D 10/00-139
See application file for complete search history.

(56) References Cited

U.S. PATENT DOCUMENTS

| | | | |
|---|---|---|---|
| 7,861,246 B2 | 12/2010 | Lu et al. | |
| 9,811,380 B1* | 11/2017 | Martin | G06F 3/0658 |
| 10,389,800 B2* | 8/2019 | Blainey | H04L 41/50 |
| 11,210,218 B1 | 12/2021 | Tavallaei et al. | |
| 11,288,096 B2* | 3/2022 | Ugale | G06F 12/0253 |
| 11,675,630 B2* | 6/2023 | Behar | G06F 9/5083 718/105 |
| 11,687,376 B2 | 6/2023 | Cheng et al. | |
| 11,924,060 B2 | 3/2024 | Smith et al. | |
| 2009/0279701 A1 | 11/2009 | Moisand et al. | |
| 2011/0213508 A1* | 9/2011 | Mandagere | G06F 1/329 700/291 |
| 2011/0239220 A1 | 9/2011 | Gibson et al. | |
| 2013/0261826 A1* | 10/2013 | Mandagere | G06F 1/329 700/291 |
| 2014/0143781 A1 | 5/2014 | Yao | |
| 2015/0081893 A1 | 3/2015 | Chadwell et al. | |
| 2015/0089507 A1 | 3/2015 | Nagao | |
| 2015/0200854 A1* | 7/2015 | Buchnik | H04L 47/10 709/235 |
| 2015/0229582 A1* | 8/2015 | Zhu | G06F 9/5011 709/224 |
| 2015/0268985 A1 | 9/2015 | Jokinen et al. | |
| 2015/0350089 A1 | 12/2015 | Wang et al. | |
| 2016/0004571 A1 | 1/2016 | Smith | |
| 2016/0350157 A1 | 12/2016 | Necas | |
| 2016/0380819 A1 | 12/2016 | Burger | |
| 2017/0286122 A1* | 10/2017 | Wu | G06F 9/5027 |
| 2018/0285766 A1 | 10/2018 | Shen et al. | |
| 2019/0034716 A1* | 1/2019 | Kamarol | G11B 27/031 |
| 2019/0043201 A1* | 2/2019 | Strong | G06V 10/96 |
| 2019/0116128 A1 | 4/2019 | Guo et al. | |
| 2019/0327328 A1 | 10/2019 | Smith et al. | |
| 2019/0370076 A1* | 12/2019 | Behar | G06N 3/063 |
| 2019/0370084 A1* | 12/2019 | Behar | G06F 9/5083 |
| 2020/0065098 A1 | 2/2020 | Parandeh Afshar et al. | |
| 2020/0065290 A1 | 2/2020 | Natu | |
| 2020/0136906 A1 | 4/2020 | Guim Bernat et al. | |
| 2020/0250003 A1* | 8/2020 | Yang | G06F 21/44 |
| 2020/0285523 A1 | 9/2020 | Guim Bernat et al. | |
| 2020/0372013 A1 | 11/2020 | Lee et al. | |
| 2020/0394045 A1 | 12/2020 | Iwata | |
| 2021/0011765 A1 | 1/2021 | Doshi et al. | |
| 2021/0097108 A1 | 4/2021 | Goyal et al. | |
| 2021/0109785 A1 | 4/2021 | Prabhakaran et al. | |
| 2021/0200592 A1 | 7/2021 | Guim et al. | |
| 2022/0046670 A1 | 2/2022 | Lin | |
| 2022/0164242 A1* | 5/2022 | Sui | G06F 9/505 |
| 2022/0206849 A1* | 6/2022 | Guim Bernat | G06F 9/5072 |
| 2022/0286481 A1 | 9/2022 | Shaw et al. | |
| 2022/0400085 A1 | 12/2022 | Ananthanarayanan et al. | |
| 2023/0004433 A1 | 1/2023 | Kan et al. | |
| 2023/0132992 A1* | 5/2023 | Bernat | H04L 41/0889 709/201 |
| 2023/0133020 A1 | 5/2023 | Sakalley et al. | |
| 2023/0134683 A1 | 5/2023 | Carranza et al. | |
| 2023/0135645 A1 | 5/2023 | Guim Bernat et al. | |
| 2023/0135938 A1 | 5/2023 | Carranza et al. | |
| 2023/0136048 A1* | 5/2023 | Doshi | H04L 41/0889 718/102 |
| 2023/0136612 A1 | 5/2023 | Doshi et al. | |
| 2023/0136615 A1 | 5/2023 | Guim Bernat et al. | |
| 2023/0140252 A1* | 5/2023 | Carranza | H04L 41/0889 726/6 |
| 2023/0199440 A1 | 6/2023 | Lee et al. | |
| 2023/0342478 A1* | 10/2023 | Ranganathan | G06F 9/45558 |
| 2023/0401099 A1 | 12/2023 | Bruno et al. | |
| 2023/0409233 A1 | 12/2023 | Sheeley et al. | |
| 2024/0020173 A1* | 1/2024 | Chatterjee | G06F 9/5072 |
| 2024/0031221 A1 | 1/2024 | Rajagopalan et al. | |
| 2024/0112076 A1 | 4/2024 | Jain et al. | |
| 2024/0127392 A1* | 4/2024 | Hughes | G06T 1/60 |

OTHER PUBLICATIONS

Kumar, Gautam, "Swift: Delay is Simple and Effective for Congestion Control in the Datacenter", SIGCOMM '20, (Aug. 2020), 15 pgs.

Mittal, Radhika, "Timely: RTT-Based Congestion Control For The Data Center", SIGCOMM, (Aug. 2015), 14 pgs.

U.S. Appl. No. 18/090,653, filed Dec. 29, 2022, Accelerator or Accelerated Functions as a Service Using Networked Processing Units.

U.S. Appl. No. 18/090,701, filed Dec. 29, 2022, Virtual Pools and Resources Using Distributed Networked Processing Units.

U.S. Appl. No. 18/090,813, filed Dec. 29, 2022, Service Mesh Switching.

U.S. Appl. No. 18/090,720, filed Dec. 29, 2022, Memory Interleaving Coordinated by Networked Processing Units.

U.S. Appl. No. 18/090,749, filed Dec. 29, 2022, Optimizing Concurrent Execution Using Networked Proces Sing Units.

U.S. Appl. No. 18/090,764, filed Dec. 29, 2022, Management of Workload Proces Sing Using Distributed Networked Proces Sing Units.

U.S. Appl. No. 18/090,842, filed Dec. 29, 2022, Localized Device Attestation.

U.S. Appl. No. 18/090,786, filed Dec. 29, 2022, Infrastructure-Delegated Orchestration Backup Using Networked Processing Units.

U.S. Appl. No. 18/090,686, filed Dec. 29, 2022, Federated Distribution of Computation and Operations Using Networked Processing Units.

"Elastics.cloud First to DemonstrateCXLtm Enabled Symmetric Multi HostMemory Pooling and Expansion", [Online]. Retrieved from the Internet https www.prnewswire.com news-releases elasticscloud-first-to-demonstrate-cxl-enabled-symmetric-multi-host-memory-pooling-and-expansion-301633093.html, Sep. 26, 2022, 3 pages.

(56) References Cited

OTHER PUBLICATIONS

"The GigaIO Fabrex Memory Fabric Memory Pooling Overview", [Online]. Retrieved from the Internet https gigaio.com project memory-pooling-overview , Feb. 2020, 8 pages.
"Marvell Announces Innovative CXL Development Platform for Multi-Host Memory Pooling", [Online]. Retrieved from the Internet https www.prnewswire.com news-releases marvell-announces-innovative-cxl-development-platform-for-multi-host-memory-pooling-301675043.html, Nov. 10, 2022, 3 pages.
"Intel Threading Building Blocks Tutorial v1.21", Intel Corporation, Oct. 27, 2011, 90 pages.
"U.S. Appl. No. 18/090,686, Non Final Office Action mailed Dec. 23, 2025", 8 pgs.
"U.S. Appl. No. 18/090,749, Non Final Office Action mailed Jan. 8, 2026", 11 pgs.
"U.S. Appl. No. 18/090,720, Non Final Office Action mailed Jan. 28, 2026", 13 pgs.
"U.S. Appl. No. 18/090,786, Non Final Office Action mailed Jan. 28, 2026", 21 pgs.
"U.S. Appl. No. 18/090,701, Non Final Office Action mailed Feb. 9, 2026", 9 pgs.
"U.S. Appl. No. 18/090,764, Non Final Office Action mailed Feb. 11, 2026", 15 pgs.
"U.S. Appl. No. 18/090,813, Non Final Office Action mailed Feb. 13, 2026", 17 pgs.
"U.S. Appl. No. 18/090,653, Non Final Office Action mailed Feb. 20, 2026", 25 pgs.
"U.S. Appl. No. 18/090,686, Response filed Mar. 4, 26 to Non Final Office Action mailed Dec. 23, 2025", 9 pgs.
Ananthanarayanan, Ganesh, "Reining in the Outliers in Map Reduce Clusters using Mantri", 9th USENIX Symposium on Operating Systems Design and Implementation OSDI 10., 2010, 14 pages.
Moore, Andrew, "IPU-Based Cloud Infrastructure The Fulcrum For Digital Business", Intel Corporation, 2021, 6 pgs.
Nayyer, M. Z., "LBRO Load Balancing for Resource Optimization in Edge Computing", IEEE Access, vol. 10, pp. 97439-97449, doi 10.1109 ACCESS.2022.3205741., 2022, 11 pgs.

* cited by examiner

| Tiers | On-Premise Edge | | | | 230 Network Edge | | 240 DC Edge | | 250 260 Core DC / Public Cloud | |
|---|---|---|---|---|---|---|---|---|---|---|
| | 210 Intelligent Sensor/GW | | 220 Intelligent Edge | | | | | | | |
| Network Latencies (Wire Round Trip) | <1ms | | <1ms | | 1-5ms | | 5ms+1-2ms (every 100kms) | | 5ms+5 ms (every 400kms) | |
| Deployment Requirements | Compute Available Power: <50W<br>Form Factor: Small Box<br>Thermals: NEBs Mgmt.: Remote | | Compute Available Power: ~10KW<br>Form Factor: Rack(s)<br>Thermals: NEBS Or Standard DC<br>Mgmt.: Remote | | Compute Available Power: <600W<br>Form Factor: Pizza Box<br>Thermals: NEBS Mgmt.: Remote | | Compute Available Power: 9KW/rack/1KW Sqm<br>Form Factor: Rack(s)<br>Thermals: NEBS or Standard DC<br>Mgmt.: Remote | | Standard Data Center (DC) | |
| Where, What & Why | Use Case | KPI | Use Case | KPI | Use Case | KPI | Use Case | KPI | Use Case | KPI |
| | Intelligent Transportation | Data Privacy, Backhaul Traffic, Savings, Reliability | AR/VR | Latency. Backhaul Traffic Savings, Network Scalability | Intelligent Transportation | Data Privacy, Backhaul Traffic Savings, Reliability Throughput Latency | Intelligent Transportation | Data Privacy | CDN | Backhaul Traffic Savings, Throughput |
| | V2V | Latency | Retail | Data Privacy, Backhaul Traffic Savings, Reliability | V2V | Latency | Video Analytics | Same as Int. Transp. | Storage GW | Same as CDN |
| | Retail | Same As Int. Transp. | RT Streaming Healthcare | Same as AR/VR Access to Services | Video Analytics | Same as Int. Transp. | Drone/IoT | Same As Int. Transp. | | |
| | Video Analytics | Same as Int. Transp. | | | Drone/IoT | Same as Int. Transp. | Healthcare | Access to Services | | |
| | | | | | Rural | Access to Services | CDN & Storage | Backhaul Traffic Savings, Throughput | | |
| | | | | | | | Faas | Latency | | |
| | | | | | | | AR/VR/MR | Latency | | |

FIG. 3

IN-FLIGHT INCREMENTAL PROCESSING

PRIORITY CLAIM

This application claims the benefit of priority to U.S. Provisional Patent Application No. 63/425,857, filed Nov. 16, 2022, and titled "COORDINATION OF DISTRIBUTED NETWORKED PROCESSING UNITS", which is incorporated herein by reference in its entirety.

TECHNICAL FIELD

Embodiments described herein generally relate to data processing, network communication, and communication system implementations of distributed computing, including the implementations with the use of networked processing units such as infrastructure processing units (IPUs) or data processing units (DPUs).

BACKGROUND

System architectures are moving to highly distributed multi-edge and multi-tenant deployments. Deployments may have different limitations in terms of power and space. Deployments also may use different types of compute, acceleration, and storage technologies in order to overcome these power and space limitations. Deployments also are typically interconnected in tiered and/or peer-to-peer fashion, in an attempt to create a network of connected devices and edge appliances that work together.

Edge computing, at a general level, has been described as systems that provide the transition of compute and storage resources closer to endpoint devices at the edge of a network (e.g., consumer computing devices, user equipment, etc.). As compute and storage resources are moved closer to endpoint devices, a variety of advantages have been promised such as reduced application latency, improved service capabilities, improved compliance with security or data privacy requirements, improved backhaul bandwidth, improved energy consumption, and reduced cost. However, many deployments of edge computing technologies—especially complex deployments for use by multiple tenants—have not been fully adopted.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 depicts additional characteristics of respective deployments tiers in a distributed edge computing environment, according to an example;

DETAILED DESCRIPTION

Figure 1:
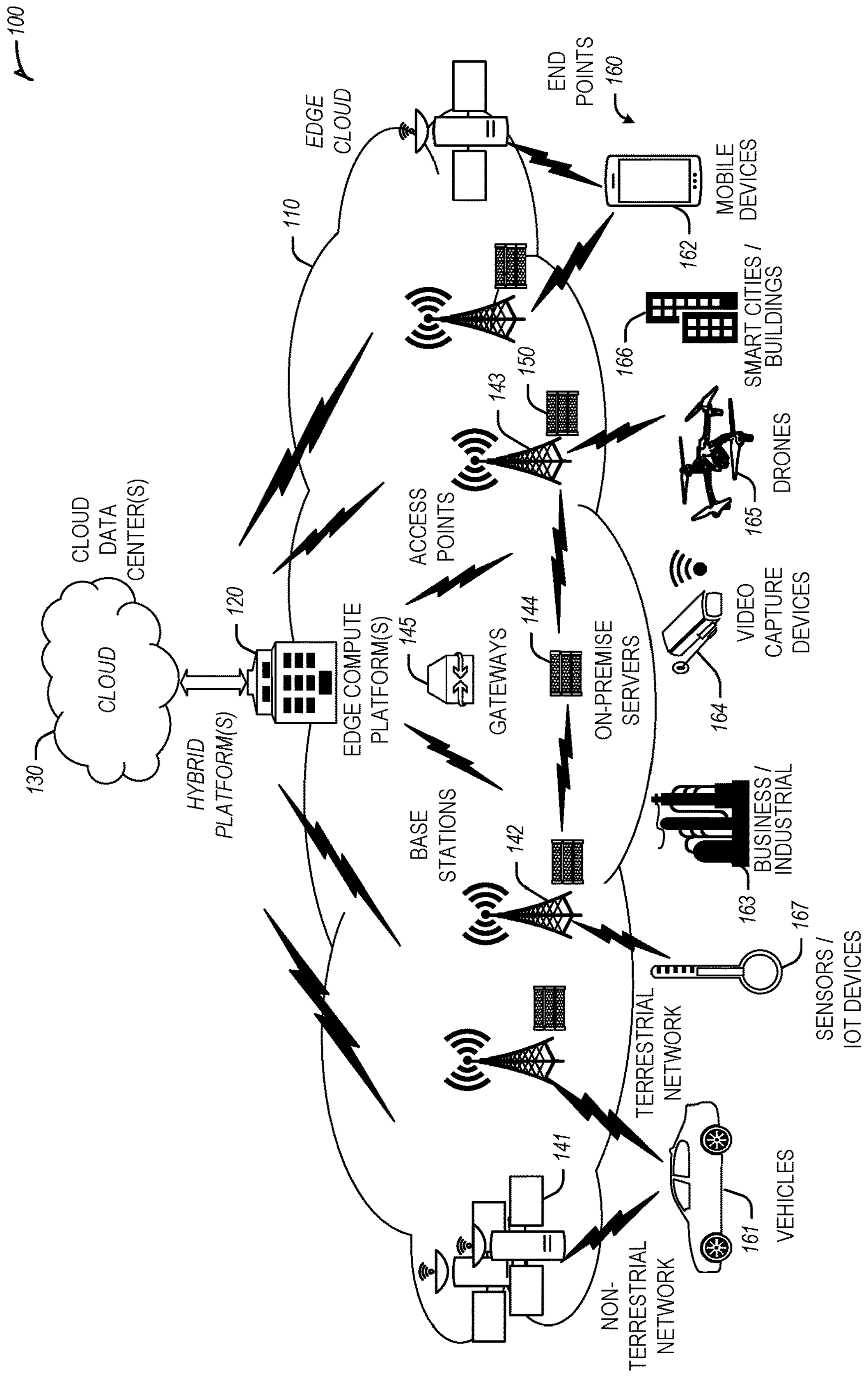
FIG. 1 illustrates an overview of a distributed edge computing environment, according to an example.

Sophisticated cloud deployments (e.g., including cloud-edge hybrid deployments) may include acquisition and processing of data at various locations throughout the network. For example, cameras at the edge may produce image streams that are sent to the cloud for feature recognition. This traffic, however, may introduce latencies of network effects (e.g., network segment saturation) that causes the workflow to fail. For example, if a camera observing a door takes several minutes to transmit the image data to a cloud server in order to order the door to open (e.g., unlock), the use case may be untenable. Using several components in the network closer to the action, such as near-edge devices, may reduce the latency to acceptable levels. However, the variability in near-edge availability or capability may make such near-edge processing difficult. Often, an orchestrator is used to facilitate the variability on near-edge computing. However, if the orchestrator of converged edge architecture attempts to move computing from far (e.g., on-premises) edge to near-edge or regional cloud facilities due to the real-time availability (e.g., unavailability) of resources, the network infrastructure may need to move a large amount of unprocessed data from the far (e.g., access) edge to the near-edge (e.g., regional) cloud. This may result in excessive (e.g., sudden) traffic bursts that may cause instability in the network.

If workloads can be decomposed into primitives (e.g., functions) such that the primitives may be individually processed to IPUs or other programmable networking elements, the processing of data may be handled, at least partially, on the path from the access edge (e.g., far-edge or on-premises edge) to the near-edge or regional cloud. Thus, as the data is transferred towards a destination, capable intervening nodes may process part of the workload in-transit. In an example, an orchestrator may send control plane messages to the infrastructure processing components to prepare for traffic to allocate additional resources (e.g., buffers) for workflows. These control messages may include priority (e.g., service level agreement (SLA)) information that may be used to established which workloads to process if resources are limited. An SLA is a combination of a feature and a value to meet the feature. Thus, if the SLA is a for latency in processing, the SLA defines the feature (e.g., processing) and that the value corresponds to latency. The value indicates a measurement for the feature that is acceptable. Thus, the value may be considered a threshold for the feature. If the threshold is met, the SLA is maintained. Otherwise, the SLA is violated.

In an example, the control messages may be used to reserve hardware or software resources along the path. In an example, the reserved resources may be used opportunistically, for example, on a first come first serve basis. Because infrastructure resources may be scarce and primarily allocated for accelerating jobs—such as remote procedure calls (RPCs), cryptographic tasks, encoding (e.g., encapsulation) or decoding (e.g., decapsulation), among others—such resources are generally used judiciously and reserved for workloads (e.g., applications) with have stringent SLA requirements. Additional details and examples of a graph-based workload for in-flight incremental processing, including in settings coordinated via networked processing units, are provided below.

FIG. 1 is a block diagram 100 showing an overview of a distributed edge computing environment, which may be adapted for implementing the present techniques for distributed networked processing units. As shown, the edge cloud 110 is established from processing operations among one or more edge locations, such as a satellite vehicle 141, a base station 142, a network access point 143, an on premise server 144 or on premise server 150, a network gateway 145, or similar networked devices and equipment instances. These processing operations may be coordinated by one or more edge computing platforms 120 or systems that operate networked processing units (e.g., IPUs, DPUs) as discussed herein.

The edge cloud 110 is generally defined as involving compute that is located closer to endpoints 160 (e.g., consumer and producer data sources) than the cloud 130, such as autonomous vehicles 161, user equipment 162, business and industrial equipment 163, video capture devices 164, drones 165, smart cities and building devices 166, sensors and IoT devices 167, etc. Compute, memory, network, and storage resources that are offered at the entities in the edge cloud 110 can provide ultra-low or improved latency response times for services and functions used by the endpoint data sources as well as reduce network backhaul traffic from the edge cloud 110 toward cloud 130 thus improving energy consumption and overall network usages among other benefits.

Compute, memory, and storage are scarce resources, and generally decrease depending on the edge location (e.g., fewer processing resources being available at consumer end point devices than at a base station or a central office data center). As a general design principle, edge computing attempts to minimize the number of resources needed for network services, through the distribution of more resources that are located closer both geographically and in terms of in-network access time.

Figure 2:
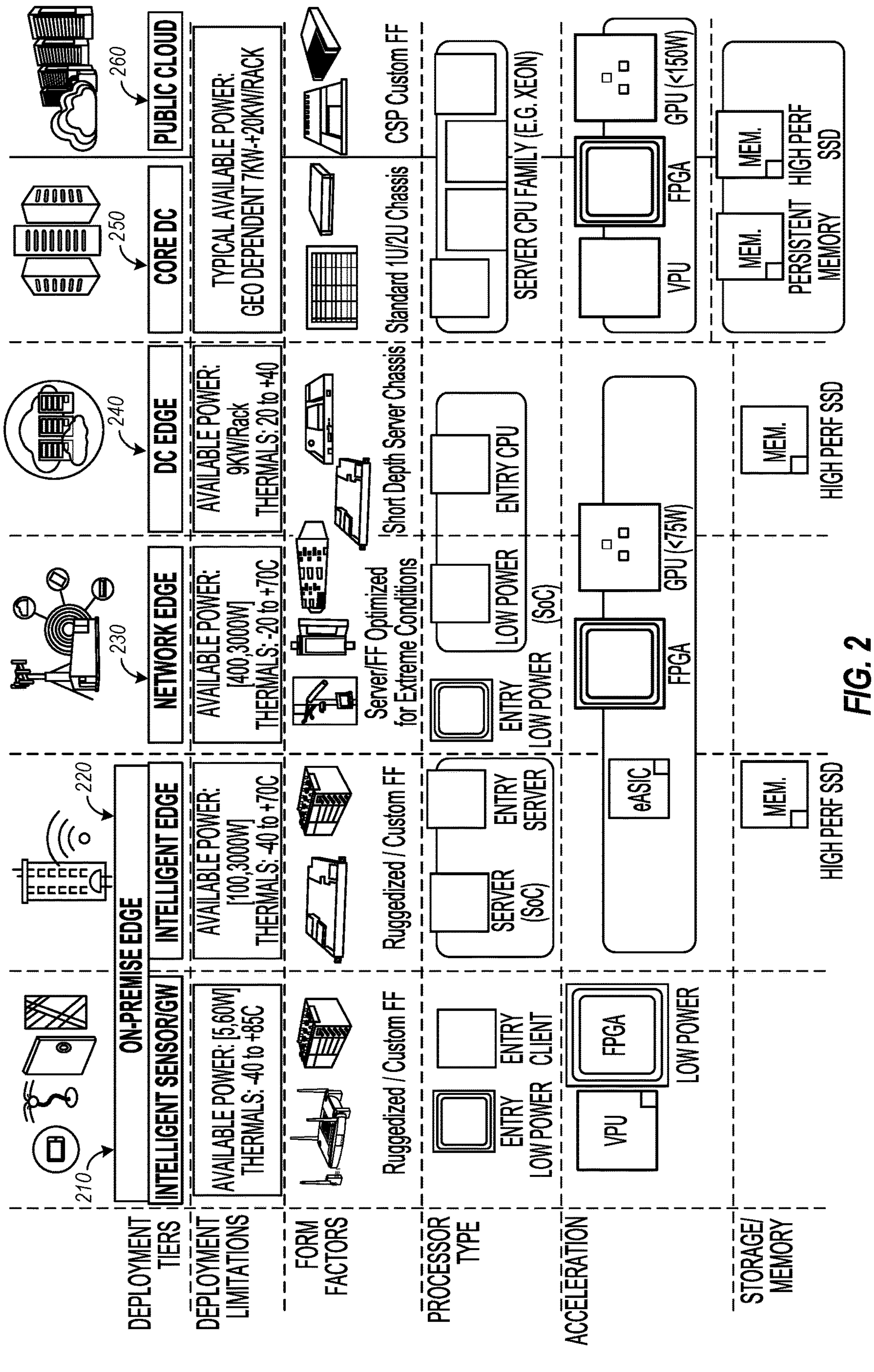
FIG. 2 depicts computing hardware provided among respective deployment tiers in a distributed edge computing environment, according to an example.

FIG. 2 depicts examples of computing hardware provided among respective deployment tiers in a distributed edge computing environment. Here, one tier at an on-premise edge system is an intelligent sensor or gateway tier 210, which operates network devices with low power and entry-level processors and low-power accelerators. Another tier at an on-premise edge system is an intelligent edge tier 220, which operates edge nodes with higher power limitations and may include a high-performance storage.

Further in the network, a network edge tier 230 operates servers including form factors optimized for extreme conditions (e.g., outdoors). A data center edge tier 240 operates additional types of edge nodes such as servers, and includes increasingly powerful or capable hardware and storage technologies. Still further in the network, a core data center tier 250 and a public cloud tier 260 operate compute equipment with the highest power consumption and largest configuration of processors, acceleration, storage/memory devices, and highest throughput network.

In each of these tiers, various forms of Intel® processor lines are depicted for purposes of illustration; it will be understood that other brands and manufacturers of hardware will be used in real-world deployments. Additionally, it will be understood that additional features or functions may exist among multiple tiers. One such example is connectivity and infrastructure management that enable a distributed IPU architecture, that can potentially extend across all of tiers 210, 220, 230, 240, 250, 260. Other relevant functions that may extend across multiple tiers may relate to security features, domain or group functions, and the like.

FIG. 3 depicts additional characteristics of respective deployment tiers in a distributed edge computing environment, based on the tiers discussed with reference to FIG. 2. This figure depicts additional network latencies at each of the tiers 210, 220, 230, 240, 250, 260, and the gradual increase in latency in the network as the compute is located at a longer distance from the edge endpoints. Additionally, this figure depicts additional power and form factor constraints, use cases, and key performance indicators (KPIs).

With these variations and service features in mind, edge computing within the edge cloud 110 may provide the ability to serve and respond to multiple applications of the use cases in real-time or near real-time and meet ultra-low latency requirements. As systems have become highly-distributed, networking has become one of the fundamental pieces of the architecture that allow achieving scale with resiliency, security, and reliability. Networking technologies have evolved to provide more capabilities beyond pure network routing capabilities, including to coordinate quality of service, security, multi-tenancy, and the like. This has also been accelerated by the development of new smart network adapter cards and other type of network derivatives that incorporated capabilities such as ASICs (application-specific integrated circuits) or FPGAs (field programmable gate arrays) to accelerate some of those functionalities (e.g., remote attestation).

In these contexts, networked processing units have begun to be deployed at network cards (e.g., smart NICs), gateways, and the like, which allow direct processing of network workloads and operations. One example of a networked processing unit is an infrastructure processing unit (IPU), which is a programmable network device that can be extended to provide compute capabilities with far richer functionalities beyond pure networking functions. Another example of a network processing unit is a data processing unit (DPU), which offers programmable hardware for performing infrastructure and network processing operations. The following discussion refers to functionality applicable to an IPU configuration, such as that provided by an Intel® line of IPU processors. However, it will be understood that functionality will be equally applicable to DPUs and other types of networked processing units provided by ARM®, Nvidia®, and other hardware OEMs.

Figure 4:
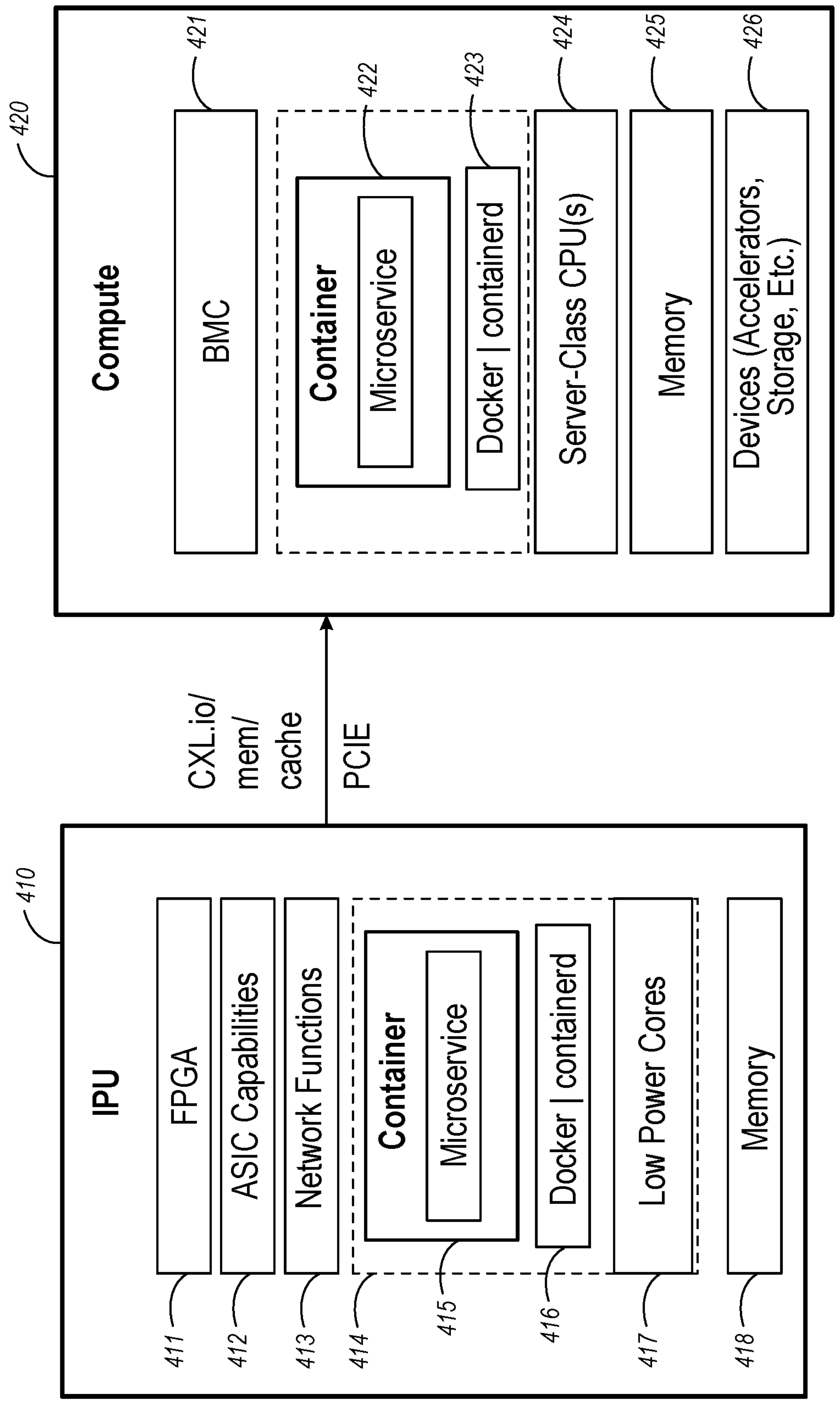
FIG. 4 depicts a computing system architecture including a compute platform and a network processing platform provided by an infrastructure processing unit, according to an example.

FIG. 4 depicts an example compute system architecture that includes a compute platform 420 and a network processing platform comprising an IPU 410. This architecture—and in particular the IPU 410—can be managed, coordinated, and orchestrated by the functionality discussed below, including with the functions described with reference to FIG. 6.

The main compute platform 420 is composed by typical elements that are included with a computing node, such as one or more CPUs 424 that may or may not be connected via a coherent domain (e.g. via Ultra Path Interconnect (UPI) or another processor interconnect); one or more memory units 425; one or more additional discrete devices 426 such as storage devices, discrete acceleration cards (e.g. an FPGA, a visual processing unit (VPU), etc.); a baseboard management controller 421; and the like. The compute platform 420 may operate one or more containers 422 (e.g., with one or more microservices), within a container runtime 423 (e.g., Docker containerd). The IPU 410 operates as a networking interface and is connected to the compute platform 420 using an interconnect (e.g., using either PCIe or CXL). The IPU 410, in this context, can be observed as another small compute device that has its own: (1) Processing cores (e.g., provided by low-power cores 417), (2) operating system (OS) and cloud native platform 414 to operate one or more containers 415 and a container runtime 416; (3) Acceleration functions provided by an ASIC 411 or FPGA 412; (4) Memory 418; (5) Network functions provided by network circuitry 413; etc.

From a system design perspective, this arrangement provides important functionality. The IPU 410 is seen as a discrete device from the local host (e.g., the OS running in the compute platform CPUs 424) that is available to provide certain functionalities (networking, acceleration etc.). Those functionalities are typically provided via Physical or Virtual PCIe functions. Additionally, the IPU 410 is seen as a host (with its own IP etc.) that can be accessed by the infrastructure to setup an OS, run services, and the like. The IPU 410 sees all the traffic going to the compute platform 420 and can perform actions—such as intercepting the data or performing some transformation—as long as the correct security credentials are hosted to decrypt the traffic. Traffic going through the IPU goes to all the layers of the Open Systems Interconnection model (OSI model) stack (e.g., from physical to application layer). Depending on the features that the IPU has, processing may be performed at the transport layer only. However, if the IPU has capabilities to perform traffic intercept, then the IPU also may be able to intercept traffic at the traffic layer (e.g., intercept CDN traffic and process it locally).

Some of the use cases being proposed for IPUs and similar networked processing units include: to accelerate network processing; to manage hosts (e.g., in a data center); or to implement quality of service policies. However, most of functionalities today are focused at using the IPU at the local appliance level and within a single system. These approaches do not address how the IPUs could work together in a distributed fashion or how system functionalities can be divided among the IPUs on other parts of the system. Accordingly, the following introduces enhanced approaches for enabling and controlling distributed functionality among multiple networked processing units. This enables the extension of current IPU functionalities to work as a distributed set of IPUs that can work together to achieve stronger features such as, resiliency, reliability, etc.

Distributed Architectures of IPUs

Figure 5:
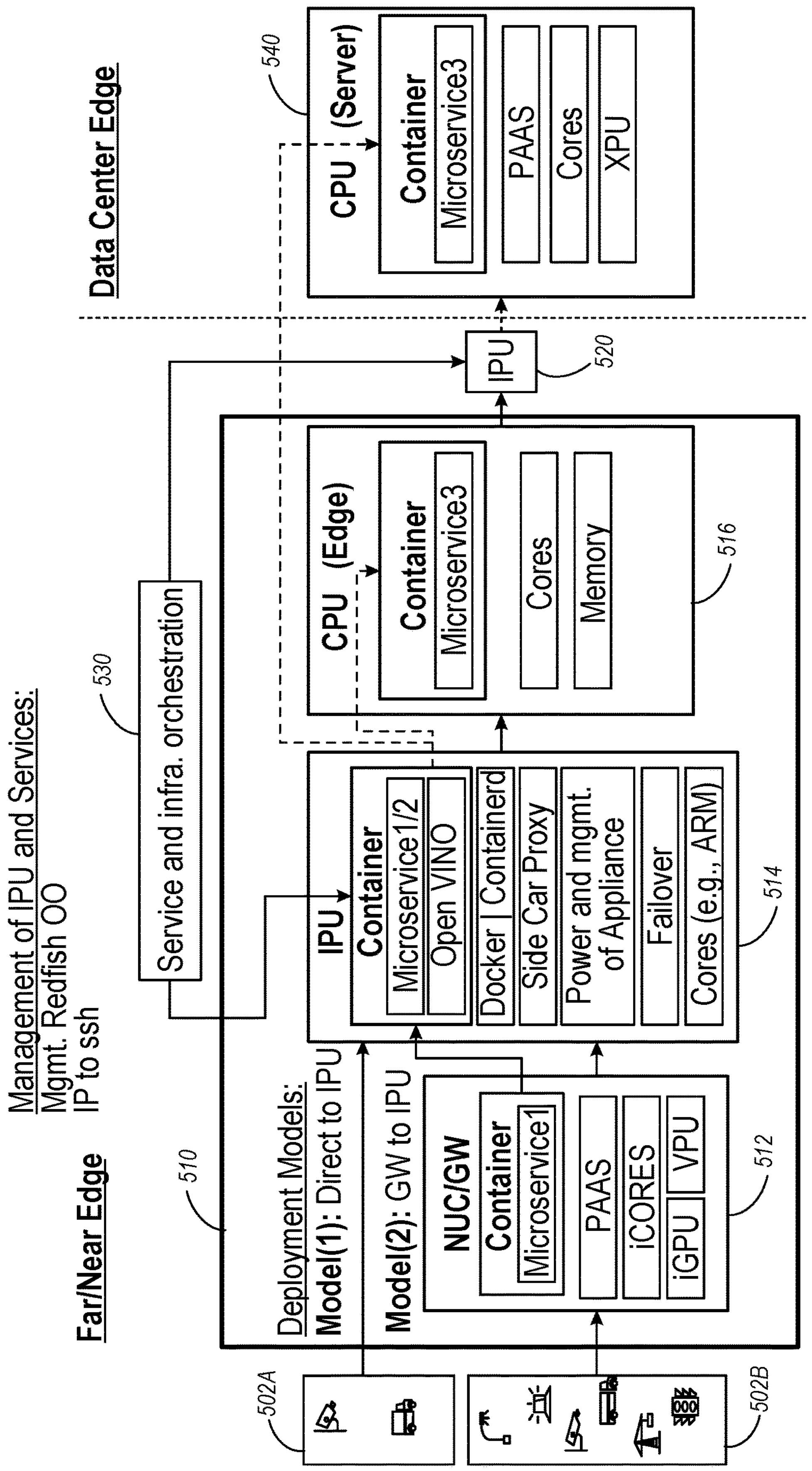
FIG. 5 depicts an infrastructure processing unit arrangement operating as a distributed network processing platform within network and data center edge settings, according to an example.

FIG. 5 depicts an IPU arrangement operating as a distributed network processing platform within network and data center edge settings. In a first deployment model of a computing environment 510, workloads or processing requests are directly provided to an IPU platform, such as directly to IPU 514. In a second deployment model of the computing environment 510, workloads or processing requests are provided to some intermediate processing device 512, such as a gateway or NUC (next unit of computing) device form factor, and the intermediate processing device 512 forwards the workloads or processing requests to the IPU 514. It will be understood that a variety of other deployment models involving the composability and coordination of one or more IPUs, compute units, network devices, and other hardware may be provided.

With the first deployment model, the IPU 514 directly receives data from use cases 502A. The IPU 514 operates one or more containers with microservices to perform processing of the data. As an example, a small gateway (e.g., a NUC type of appliance) may connect multiple cameras to an edge system that is managed or connected by the IPU 514. The IPU 514 may process data as a small aggregator of sensors that runs on the far edge, or may perform some level of inline or preprocessing and that sends payload to be further processed by the IPU or the system that the IPU connects.

With the second deployment model, the intermediate processing device 512 provided by the gateway or NUC receives data from use cases 502B. The intermediate processing device 512 includes various processing elements (e.g., CPU cores, GPUs), and may operate one or more microservices for servicing workloads from the use cases 502B. However, the intermediate processing device 512 invokes the IPU 514 to complete processing of the data.

In either the first or the second deployment model, the IPU 514 may connect with a local compute platform, such as that provided by a CPU 516 (e.g., Intel® Xeon CPU) operating multiple microservices. The IPU may also connect with a remote compute platform, such as that provided at a data center by CPU 540 at a remote server. As an example, consider a microservice that performs some analytical processing (e.g., face detection on image data), where the CPU 516 and the CPU 540 provide access to this same microservice. The IPU 514, depending on the current load of the CPU 516 and the CPU 540, may decide to forward the images or payload to one of the two CPUs. Data forwarding or processing can also depend on other factors such as SLA for latency or performance metrics (e.g., perf/watt) in the two systems. As a result, the distributed IPU architecture may accomplish features of load balancing.

The IPU in the computing environment 510 may be coordinated with other network-connected IPUs. In an example, a Service and Infrastructure orchestration manager 530 may use multiple IPUs as a mechanism to implement advanced service processing schemes for the user stacks. This may also enable implementing of system functionalities such as failover, load balancing etc.

In a distributed architecture example, IPUs can be arranged in the following non-limiting configurations. As a first configuration, a particular IPU (e.g., IPU 514) can work with other IPUs (e.g., IPU 520) to implement failover mechanisms. For example, an IPU can be configured to forward traffic to service replicas that runs on other systems when a local host does not respond.

As a second configuration, a particular IPU (e.g., IPU 514) can work with other IPUs (e.g., IPU 520) to perform load balancing across other systems. For example, consider a scenario where CDN traffic targeted to the local host is forwarded to another host in case that I/O or compute in the local host is scarce at a given moment.

As a third configuration, a particular IPU (e.g., IPU 514) can work as a power management entity to implement advanced system policies. For example, consider a scenario where the whole system (e.g., including CPU 516) is placed in a C6 state (a low-power/power-down state available to a processor) while forwarding traffic to other systems (e.g., IPU 520) and consolidating it.

As will be understood, fully coordinating a distributed IPU architecture requires numerous aspects of coordination and orchestration. The following examples of system architecture deployments provide discussion of how edge computing systems may be adapted to include coordinated IPUs, and how such deployments can be orchestrated to use IPUs at multiple locations to expand to the new envisioned functionality.

Distributed IPU Functionality

Figure 6:
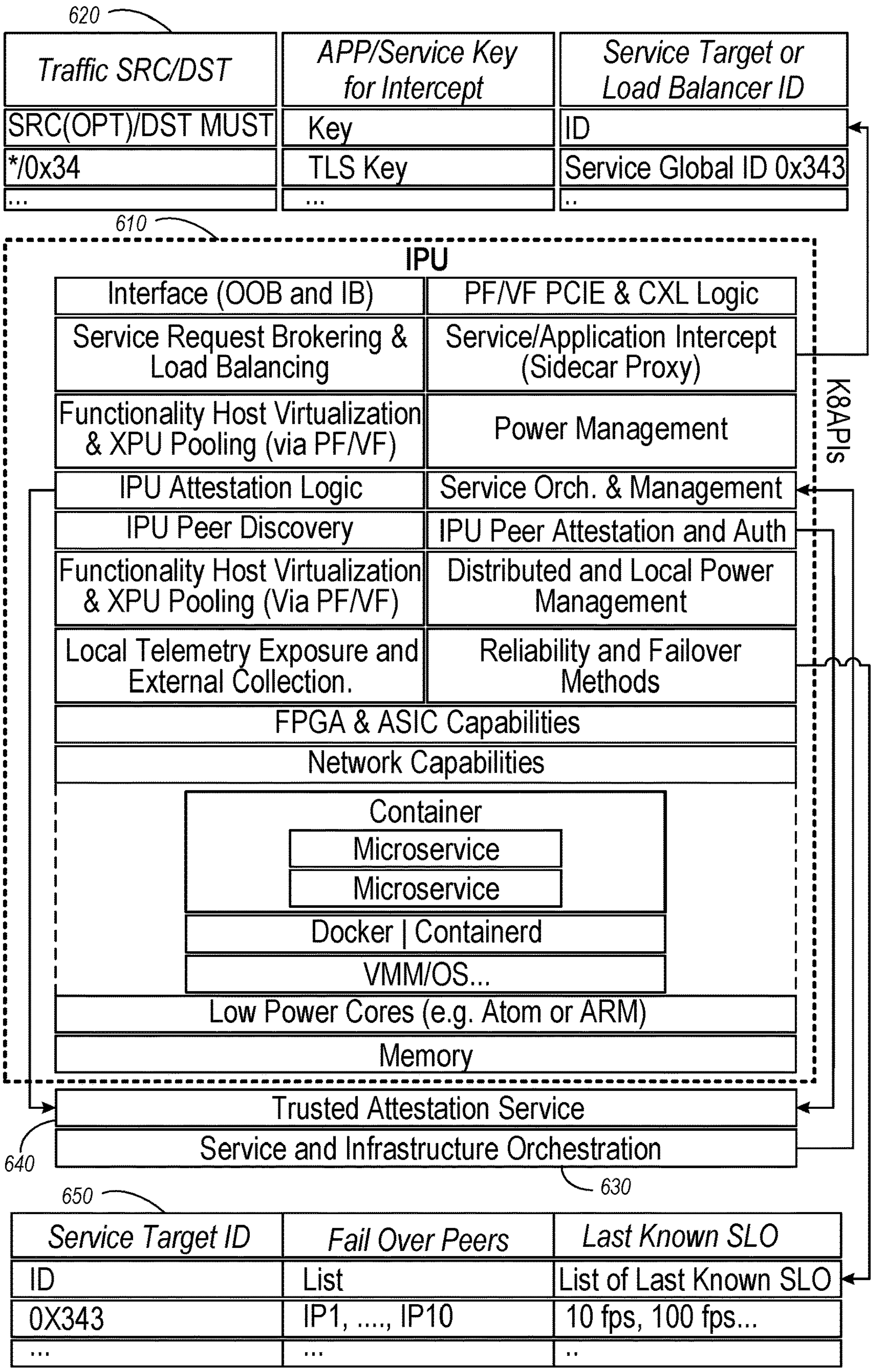
FIG. 6 depicts functional components of an infrastructure processing unit and related services, according to an example.

An arrangement of distributed IPUs offers a set of new functionalities to enable IPUs to be service focused. FIG. 6 depicts functional components of an IPU 610, including services and features to implement the distributed functionality discussed herein. It will be understood that some or all of the functional components provided in FIG. 6 may be distributed among multiple IPUs, hardware components, or platforms, depending on the particular configuration and use case involved.

In the block diagram of FIG. 6, a number of functional components are operated to manage requests for a service running in the IPU (or running in the local host). As discussed above, IPUs can either run services or intercept requests arriving to services running in the local host and perform some action. In the latter case, the IPU can perform the following types of actions/functions (provided as a non-limiting examples).

Peer Discovery. In an example, each IPU is provided with Peer Discovery logic to discover other IPUs in the distributed system that can work together with it. Peer Discovery logic may use mechanisms such as broadcasting to discover other IPUs that are available on a network. The Peer Discovery logic is also responsible to work with the Peer Attestation and Authentication logic to validate and authenticate the peer IPU's identity, determine whether they are trustworthy, and whether the current system tenant allows the current IPU to work with them. To accomplish this, an IPU may perform operations such as: retrieve a proof of identity and proof of attestation; connect to a trusted service running in a trusted server; or, validate that the discovered system is trustworthy. Various technologies (including hardware components or standardized software implementations) that enable attestation, authentication, and security may be used with such operations.

Peer Attestation. In an example, each IPU provides interfaces to other IPUs to enable attestation of the IPU itself. IPU Attestation logic is used to perform an attestation flow within a local IPU in order to create the proof of identity that will be shared with other IPUs. Attestation here may integrate previous approaches and technologies to attest a compute platform. This may also involve the use of trusted attestation service 640 to perform the attestation operations.

Functionality Discovery. In an example, a particular IPU includes capabilities to discover the functionalities that peer IPUs provide. Once the authentication is done, the IPU can determine what functionalities that the peer IPUs provide (using the IPU Peer Discovery Logic) and store a record of such functionality locally. Examples of properties to discover can include: (i) Type of IPU and functionalities provided and associated KPIs (e.g. performance/watt, cost etc.); (ii) Available functionalities as well as possible functionalities to execute under secure enclaves (e.g. enclaves provided by Intel® SGX or TDX technologies); (iii) Current services that are running on the IPU and on the system that can potentially accept requests forwarded from this IPU; or (iv) Other interfaces or hooks that are provided by an IPU, such as: Access to remote storage; Access to a remote VPU; Access to certain functions. In a specific example, service may be described by properties such as: UUID; Estimated performance KPIs in the host or IPU; Average performance provided by the system during the N units of time (or any other type of indicator); and like properties.

Service Management. The IPU includes functionality to manage services that are running either on the host compute platform or in the IPU itself. Managing (orchestration) services includes performance service and resource orchestration for the services that can run on the IPU or that the IPU can affect. Two type of usage models are envisioned:

External Orchestration Coordination. The IPU may enable external orchestrators to deploy services on the IPU compute capabilities. To do so, an IPU includes a component similar to K8 compatible APIs to manage the containers (services) that run on the IPU itself. For example, the IPU may run a service that is just providing content to storage connected to the platform. In this case, the orchestration entity running in the IPU may manage the services running in the IPU as it happens in other systems (e.g. keeping the service level objectives).

Further, external orchestrators can be allowed to register to the IPU that services are running on the host may require to broker requests, implement failover mechanisms and other functionalities. For example, an external orchestrator may register that a particular service running on the local compute platform is replicated in another edge node managed by another IPU where requests can be forwarded.

In this later use case external orchestrators may provide to the Service/Application Intercept logic the inputs that are needed to intercept traffic for these services (as typically is encrypted). This may include properties such as a source and destination traffic of the traffic to be intercepted, or the key to use to decrypt the traffic. Likewise, this may be needed to terminate TLS to understand the requests that arrive to the IPU and that the other logics may need to parse to take actions. For example, if there is a CDN read request the IPU may need to decrypt the packet to understand that network packet includes a read request and may redirect it to another host based on the content that is being intercepted. Examples of Service/Application Intercept information is depicted in table 620 in FIG. 6.

External Orchestration Implementation. External orchestration can be implemented in multiple topologies. One supported topology includes having the orchestrator managing all the IPUs running on the backend public or private cloud. Another supported topology includes having the orchestrator managing all the IPUs running in a centralized edge appliance. Still another supported topology includes having the orchestrator running in another IPU that is working as the controller or having the orchestrator running distributed in multiple other IPUs that are working as controllers (master/primary node), or in a hierarchical arrangement.

Functionality for Broker requests. The IPU may include Service Request Brokering logic and Load Balancing logic to perform brokering actions on arrival for requests of target services running in the local system. For instance, the IPU may decide to see if those requests can be executed by other peer systems (e.g., accessible through Service and Infrastructure Orchestration 630). This can be caused, for example, because load in the local systems is high. The local IPU may negotiate with other peer IPUs for the possibility to forward the request. Negotiation may involve metrics such as cost. Based on such negotiation metrics, the IPU may decide to forward the request.

Functionality for Load Balancing requests. The Service Request Brokering and Load Balancing logic may distribute requests arriving to the local IPU to other peer IPUs. In this case, the other IPUs and the local IPU work together and do not necessarily need brokering. Such logic acts similar to a cloud native sidecar proxy. For instance, requests arriving to the system may be sent to the service X running in the local system (either IPU or compute platform) or forwarded to a peer IPU that has another instance of service X running. The load balancing distribution can be based on existing algorithms such as based on the systems that have lower load, using round robin, etc.

Functionality for failover, resiliency and reliability. The IPU includes Reliability and Failover logic to monitor the status of the services running on the compute platform or the status of the compute platform itself. The Reliability and Failover logic may require the Load Balancing logic to transiently or permanently forward requests that aim specific services in situations such as where: i) The compute platform is not responding; ii) The service running inside the compute node is not responding; and iii) The compute platform load prevents the targeted service to provide the right level of service level objectives (SLOs). Note that the logic must know the required SLOs for the services. Such functionality may be coordinated with service information 650 including SLO information.

Functionality for executing parts of the workloads. Use cases such as video analytics tend to be decomposed in different microservices that conform a pipeline of actions that can be used together. The IPU may include a workload pipeline execution logic that understands how workloads are composed and manage their execution. Workloads can be defined as a graph that connects different microservices. The load balancing and brokering logic may be able to understand those graphs and decide what parts of the pipeline are executed where. Further, to perform these and other operations, Intercept logic will also decode what requests are included as part of the requests.

Resource Management

A distributed network processing configuration may enable IPUs to perform important role for managing resources of edge appliances. As further shown in FIG. 6, the functional components of an IPU can operate to perform these and similar types of resource management functionalities.

As a first example, an IPU can provide management or access to external resources that are hosted in other locations and expose them as local resources using constructs such as Compute Express Link (CXL). For example, the IPU could potentially provide access to a remote accelerator that is hosted in a remote system via CXL.mem/cache and IO. Another example includes providing access to remote storage device hosted in another system. In this later case the local IPU could work with another IPU in the storage system and expose the remote system as PCIE virtual function(s) (VF)/physical function(s) (PF) to the local host.

As a second example, an IPU can provide access to IPU-specific resources. Those IPU resource may be physical (such as storage or memory) or virtual (such as a service that provides access to random number generation).

As a third example, an IPU can manage local resources that are hosted in the system where it belongs. For example, the IPU can manage power of the local compute platform.

As a fourth example, an IPU can provide access to other type of elements that relate to resources (such as telemetry or other types of data). In particular, telemetry provides useful data for something that is needed to decide where to execute things or to identify problems.

I/O Management. Because the IPU is acting as a connection proxy between the external peers (compute systems, remote storage etc.) resources and the local compute, the IPU can also include functionality to manage I/O from the system perspective.

Host Virtualization and XPU Pooling. The IPU includes Host Virtualization and XPU Pooling logic responsible to manage the access to resources that are outside the system domain (or within the IPU) and that can be offered to the local compute system. Here, "XPU" refers to any type of a processing unit, whether CPU, GPU, VPU, an acceleration processing unit, etc. The IPU logic, after discovery and attestation, can agree with other systems to share external resources with the services running in the local system. IPUs may advertise to other peers available resources or can be discovered during discovery phase as introduced earlier. IPUs may request to other IPUS to those resources. For example, an IPU on system A may request access to storage on system B manage by another IPU. Remote and local IPUs can work together to establish a connection between the target resources and the local system.

Once the connection and resource mapping is completed, resources can be exposed to the services running in the local compute node using the VF/PF PCIE and CXL Logic. Each of those resources can be offered as VF/PF. The IPU logic can expose to the local host resources that are hosted in the IPU. Examples of resources to expose may include local accelerators, access to services, and the like.

Power Management. Power management is one of the key features to achieve favorable system operational expenditures (OPEXs). IPU is very well positioned to optimize power consumption that the local system is consuming. The Distributed and local power management unit is responsible for metering the power that the system is consuming, the load that the system is receiving and track the service level agreements that the various services running in the system are achieving for the arriving requests. Likewise, when power efficiencies (e.g., power usage effectiveness (PUE)) are not achieving certain thresholds or the local compute demand is low, the IPU may decide to forward the requests to local services to other IPUs that host replicas of the services. Such power management features may also coordinate with the Brokering and Load Balancing logic discussed above. As will be understood, IPUs can work together to decide where requests can be consolidated to establish higher power efficiency as system. When traffic is redirected, the local power consumption can be reduced in different ways. Example operations that can be performed include: changing the system to C6 State; changing the base frequencies; performing other adaptations of the system or system components.

Telemetry Metrics. The IPU can generate multiple types of metrics that can be interesting from services, orchestration or tenants owning the system. In various examples, telemetry can be accessed, including: (i) Out of band via side interfaces; (ii) In band by services running in the IPU; or (iii) Out of band using PCIE or CXL from the host perspective. Relevant types of telemetries can include: Platform telemetry; Service Telemetry; IPU telemetry; Traffic telemetry; and the like.

System Configurations for Distributed Processing

Further to the examples noted above, the following configurations may be used for processing with distributed IPUs:

1) Local IPUs connected to a compute platform by an interconnect (e.g., as shown in the configuration of FIG. 4);
2) Shared IPUs hosted within a rack/physical network—such as in a virtual slice or multi-tenant implementation of IPUs connected via CXL/PCI-E (local), or extension via Ethernet/Fiber for nodes within a cluster;
3) Remote IPUs accessed via an IP Network, such as within certain latency for data plane offload/storage offloads (or, connected for management/control plane operations); or
4) Distributed IPUs providing an interconnected network of IPUs, including as many as hundreds of nodes within a domain.

Configurations of distributed IPUs working together may also include fragmented distributed IPUs, where each IPU or pooled system provides part of the functionalities, and each IPU becomes a malleable system. Configurations of distributed IPUs may also include virtualized IPUs, such as provided by a gateway, switch, or an inline component (e.g., inline between the service acting as IPU), and in some examples, in scenarios where the system has no IPU.

Other deployment models for IPUs may include IPU-to-IPU in the same tier or a close tier; IPU-to-IPU in the cloud (data to compute versus compute to data); integration in small device form factors (e.g., gateway IPUs); gateway/NUC+IPU which connects to a data center; multiple GW/NUC (e.g. 16) which connect to one IPU (e.g. switch); gateway/NUC+IPU on the server; and GW/NUC and IPU that are connected to a server with an IPU.

The preceding distributed IPU functionality may be implemented among a variety of types of computing architectures, including one or more gateway nodes, one or more aggregation nodes, or edge or core data centers distributed across layers of the network (e.g., in the arrangements depicted in FIGS. 2 and 3). Accordingly, such IPU arrangements may be implemented in an edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives. Such edge computing systems may be embodied as a type of device, appliance, computer, or other "thing" capable of communicating with other edge, networking, or endpoint components.

Figure 7:
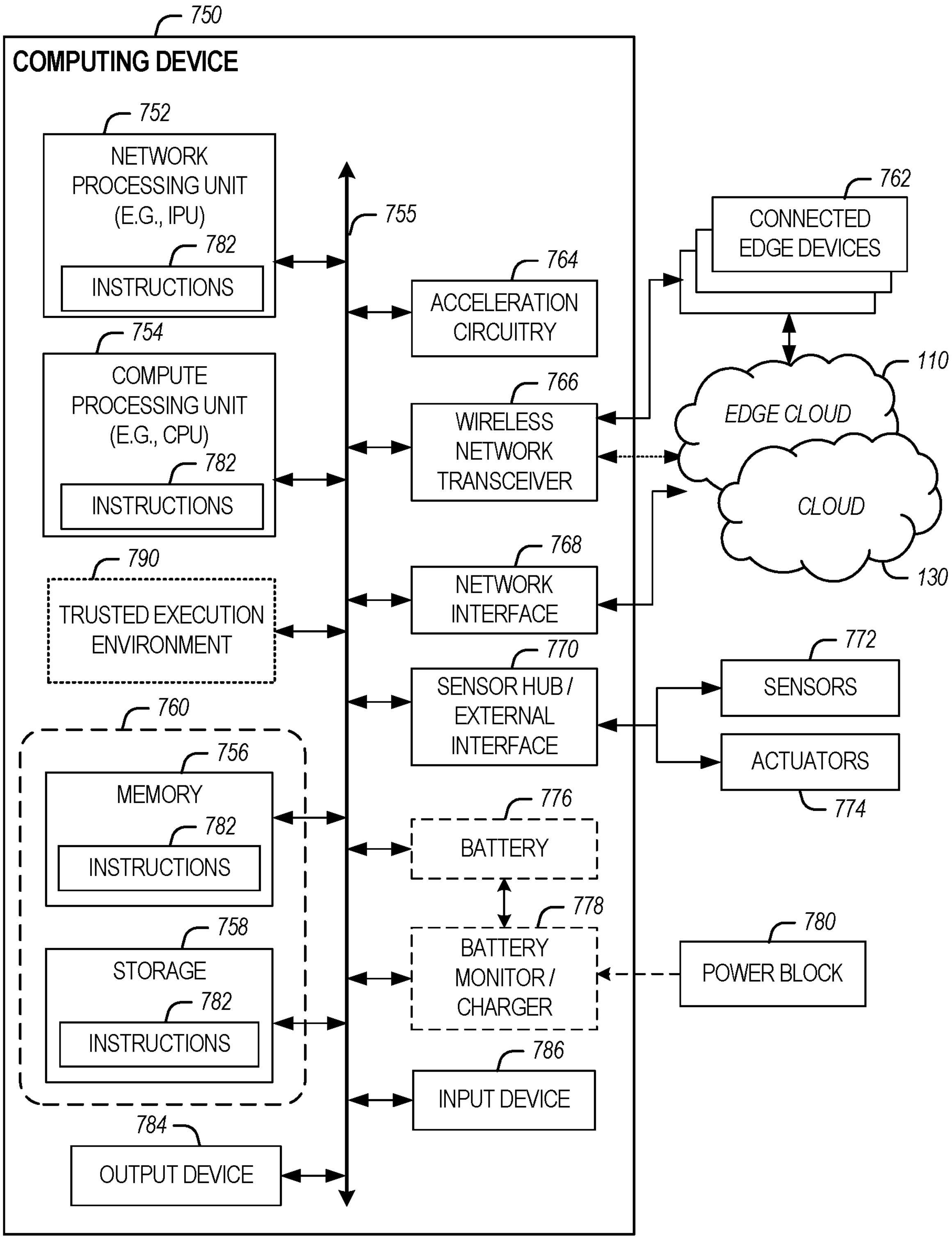
FIG. 7 depicts a block diagram of example components in an edge computing system which implements a distributed network processing platform, according to an example.

FIG. 7 depicts a block diagram of example components in a computing device 750 which can operate as a distributed network processing platform. The computing device 750 may include any combinations of the components referenced above, implemented as integrated circuits (ICs), as a package or system-on-chip (SoC), or as portions thereof, discrete electronic devices, or other modules, logic, instruction sets, programmable logic or algorithms, hardware, hardware accelerators, software, firmware, or a combination thereof adapted in the computing device 750, or as components otherwise incorporated within a larger system. Specifically, the computing device 750 may include processing circuitry comprising one or both of a network processing unit 752 (e.g., an IPU or DPU, as discussed above) and a compute processing unit 754 (e.g., a CPU).

The network processing unit 752 may provide a networked specialized processing unit such as an IPU, DPU, network processing unit (NPU), or other "xPU" outside of the central processing unit (CPU). The processing unit may be embodied as a standalone circuit or circuit package, integrated within an SoC, integrated with networking circuitry (e.g., in a SmartNIC), or integrated with acceleration circuitry, storage devices, or AI or specialized hardware, consistent with the examples above.

The compute processing unit 754 may provide a processor as a central processing unit (CPU) microprocessor, multi-core processor, multithreaded processor, an ultra-low voltage processor, an embedded processor, or other forms of a special purpose processing unit or specialized processing unit for compute operations.

Either the network processing unit 752 or the compute processing unit 754 may be a part of a system on a chip (SoC) which includes components formed into a single integrated circuit or a single package. The network processing unit 752 or the compute processing unit 754 and accompanying circuitry may be provided in a single socket form factor, multiple socket form factor, or a variety of other formats.

The processing units 752, 754 may communicate with a system memory 756 (e.g., random access memory (RAM)) over an interconnect 755 (e.g., a bus). In an example, the system memory 756 may be embodied as volatile (e.g., dynamic random access memory (DRAM), etc.) memory. Any number of memory devices may be used to provide for a given amount of system memory. A storage 758 may also couple to the processor 752 via the interconnect 755 to provide for persistent storage of information such as data, applications, operating systems, and so forth. In an example, the storage 758 may be implemented as non-volatile storage such as a solid-state disk drive (SSD).

The components may communicate over the interconnect 755. The interconnect 755 may include any number of technologies, including industry-standard architecture (ISA), extended ISA (EISA), peripheral component interconnect (PCI), peripheral component interconnect extended (PCIx), PCI express (PCIe), Compute Express Link (CXL), or any number of other technologies. The interconnect 755 may couple the processing units 752, 754 to a transceiver 766, for communications with connected edge devices 762.

The transceiver 766 may use any number of frequencies and protocols. For example, a wireless local area network (WLAN) unit may implement Wi-Fi® communications in accordance with the Institute of Electrical and Electronics Engineers (IEEE) 802.11 standard, or a wireless wide area network (WWAN) unit may implement wireless wide area communications according to a cellular, mobile network, or other wireless wide area protocol. The wireless network transceiver 766 (or multiple transceivers) may communicate using multiple standards or radios for communications at a different range. A wireless network transceiver 766 (e.g., a radio transceiver) may be included to communicate with devices or services in the edge cloud 110 or the cloud 130 via local or wide area network protocols.

The communication circuitry (e.g., transceiver 766, network interface 768, external interface 770, etc.) may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, Matter®, low-power wide-area network (LPWAN) or low-power wide-area (LPWA) protocols, etc.) to effect such communication. Given the variety of types of applicable communications from the device to another component or network, applicable communications circuitry used by the device may include or be embodied by any one or more of components 766, 768, or 770. Accordingly, in various examples, applicable means for communicating (e.g., receiving, transmitting, etc.) may be embodied by such communications circuitry.

The computing device 750 may include or be coupled to acceleration circuitry 764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 755 may couple the processing units 752, 754 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as LEDs or more complex outputs such as display screens (e.g., LCD screens), with the output of characters, graphics, multimedia objects, and the like being generated or produced from the operation of the edge computing node 750.

A battery 776 may power the edge computing node 750, although, in examples in which the edge computing node 750 is mounted in a fixed location, it may have a power supply coupled to an electrical grid, or the battery may be used as a backup or for temporary capabilities. A battery monitor/charger 778 may be included in the edge computing node 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. A power block 780, or other power supply coupled to a grid, may be coupled with the battery monitor/charger 778 to charge the battery 776.

In an example, the instructions 782 on the processing units 752, 754 (separately, or in combination with the instructions 782 of the machine-readable medium 760) may configure execution or operation of a trusted execution environment (TEE) 790. In an example, the TEE 790 operates as a protected area accessible to the processing units 752, 754 for secure execution of instructions and secure access to data. Other aspects of security hardening, hardware roots-of-trust, and trusted or protected operations may be implemented in the edge computing node 750 through the TEE 790 and the processing units 752, 754.

The computing device 750 may be a server, appliance computing devices, and/or any other type of computing device with the various form factors discussed above. For example, the computing device 750 may be provided by an appliance computing device that is a self-contained electronic device including a housing, a chassis, a case, or a shell.

In an example, the instructions 782 provided via the memory 756, the storage 758, or the processing units 752, 754 may be embodied as a non-transitory, machine-readable medium 760 including code to direct the processor 752 to perform electronic operations in the edge computing node 750. The processing units 752, 754 may access the non-transitory, machine-readable medium 760 over the interconnect 755. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processing units 752, 754 to perform a specific sequence or flow of actions, for example, as described with respect to the flowchart(s) and block diagram(s) of operations and functionality discussed herein. As used herein, the terms "machine-readable medium", "machine-readable storage", "computer-readable storage", and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers.

In an example, a software distribution platform (e.g., one or more servers and one or more storage devices) may be used to distribute software, such as the example instructions discussed above, to one or more devices, such as example processor platform(s) and/or example connected edge devices noted above. The example software distribution platform may be implemented by any computer server, data facility, cloud service, etc., capable of storing and transmitting software to other computing devices. In some examples, the providing entity is a developer, a seller, and/or a licensor of software, and the receiving entity may be consumers, users, retailers, OEMs, etc., that purchase and/or license the software for use and/or re-sale and/or sub-licensing.

In an example, the instructions are stored on storage devices of the software distribution platform in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions stored in the software distribution platform are in a first format when transmitted to an example processor platform(s). In some examples, the first format is an executable binary in which particular types of the processor platform(s) can execute. However, in some examples, the first format is uncompiled code that requires one or more preparation tasks to transform the first format to a second format to enable execution on the example processor platform(s). For instance, the receiving processor platform(s) may need to compile the computer readable instructions in the first format to generate executable code in a second format that is capable of being executed on the processor platform(s). In still other examples, the first format is interpreted code that, upon reaching the processor platform (s), is interpreted by an interpreter to facilitate execution of instructions.

Circuitry (e.g., processing circuitry) is a collection of circuits implemented in tangible entities of the computing device 750 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Figure 8:
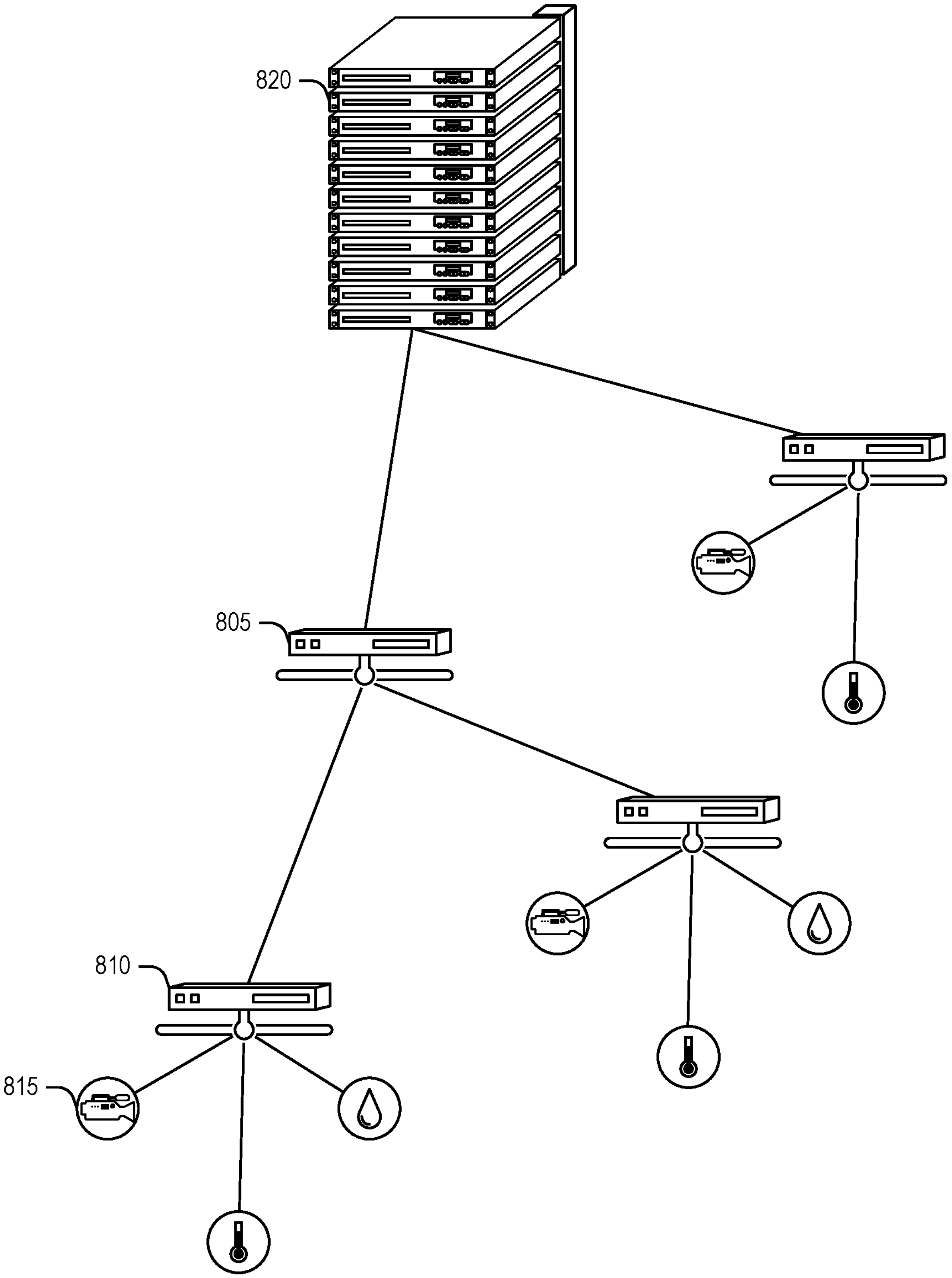
FIG. 8 depicts a system including a device for in-flight incremental processing, according to an example.

FIG. 8 depicts a system including a device for in-flight incremental processing, according to an example. As illustrated, the camera 815 (or other device) is providing data for a workload (e.g., facial recognition to unlock a door). The camera 815 is providing the data through the networking infrastructure device 810 (e.g., switch) and the networking infrastructure device 805 (e.g., a gateway) to the cloud system 820. These components include circuitry and possibly software that is configured to enable in-flight incremental processing on the workload. For clarity, the following examples are from the perspective of the networking infrastructure device 805 as the workload transits from the networking infrastructure device 810 to the cloud 820. However, other arrangements that process a portion of the workload as the workload transits a networking infrastructure device will operate as the networking infrastructure device 805 does below.

The processing circuitry of the networking infrastructure device 805 is configured to receive a payload (e.g., packet, frame, segment, etc.) is received that is part of a workload routed through the networking infrastructure device 805 from a first network node (e.g., networking infrastructure device 810) to a second network node (e.g., the cloud system 820). In an example, the processing circuitry is included in an IPU. In an example, the IPU is included in a third network node. This last example illustrates the inclusion of the IPU inside of a switch, router, gateway, or other node. In this example, the networking infrastructure device 805 is a component that is included in a node of the network. In an example, the third network node is a switch, router, or a gateway. In an example, the first network node is an edge node. In this example, the first network node is the camera 815 as illustrated in FIG. 8.

The processing circuitry is configured to obtain (e.g., retrieve or receive) a workload graph for the workload. The workload graph is a definition of the workload. Such a definition may include what functions to execute and in what order to execute those functions in order to complete the workload. With the example of a facial recognition workload, functions may include normalizing a color space of the images, reducing resolution, passing the pre-processed images to an artificial neural network, and marking up the result to indicate where faces are located within the images.

The present examples refer to a workload graph, but other structures may be used. For example, a state machine, list, etc. may form the definition of the workload. However, with the workload graph, in an example, vertices of the workload graph are functions. In an example, the edges are dependencies between functions. It is possible to have functions defined by the edges and the vertices indicate start and stop states, or the like. In any case, the functions and order of processing the functions are defined in the workload graph.

In an example, the workload graph includes SLA data for the workload. In an example, the SLA data includes an SLA on an edge in the workload graph. This is an example of a per-function SLA. Such an SLA may define maximum latencies, minimum processing precision, or other metric specific to the function. In an example, the workload graph is one of multiple workload graphs respectively corresponding to multiple workloads. In an example, each workload graph includes SLA data. These last two examples indicate the ability to provide an SLA for the entire workload and not depend the SLA upon any one function. Generally, such SLAs will define priority (e.g., either explicitly or through lower total processing time requirements). As a variety of workloads may vie for limited resources on the networking infrastructure device 805, such workload SLAs provide a mechanism to resolve contention for these resources.

In an example, the processing circuitry is configured to receive workload process data in a control plane of a network interface upon which the payload is received. The control plane signaling operates much like other network control plane signaling. For example, ethernet control plane signaling may indicate buffer use to prevent a sender from needlessly sending packets that will be dropped due to an inability for the to handle the traffic. In the present case, the control plane signaling of the process data may be used to indicate a number of workloads that are planned to be transmitted to the networking infrastructure device 805, what type of workload, what hardware may be used by the workload, etc. This data enables the networking infrastructure device 805 to prepare (e.g., reserve hardware) for the expected traffic. Thus, in an example, the workload process data includes a reservation for hardware in the networking infrastructure device 805 to perform the function when the payload arrives to the networking infrastructure device 805.

In an example, the workload process data includes identification of a vertex in the workload graph to identify the function to apply to the payload. This process data enables the networking infrastructure device 805 to quickly locate the function while minimizing control plane signaling. In an example, the workload process data includes the workload graph. Here, the workload graph may be a partial processing of the entire workload, such that the workload graph includes remaining tasks to process. In an example, the workload process data includes a reference to the workload graph. In this example, obtaining the workload graph includes using the reference to the workload graph to retrieve the workload graph. Here, the control plane signaling burden is eased via transmitting the reference instead of the entire workload graph.

The processing circuitry is configured to apply the function to the payload in accordance with the workload graph. The function modifies the payload to create a processed payload. In an example, the function is applied to the payload before a second function is applied to a second payload for a second workload based on SLA data in the workload graph and a second workload graph for the second workload. This is an example of prioritizing the first workload over the second workload given resource contention on the networking infrastructure device 805.

The processing circuitry is configured to transmit (e.g., instruct a network interface to transmit) towards the second network node (e.g., the cloud system 820). In an example, transmitting the processed payload toward the second network node includes identification of a next vertex in the workload graph to apply to the processed payload at a subsequent network node. This example of control plane signaling enables the next node to pick up the workload processing where the networking infrastructure device 805 left off.

Given the operation of the networking infrastructure device 805 described herein, workload processing has been moved forward by the application of the function to create the processed payload. The entire workload may not, however, be complete. Thus, the networking infrastructure device 805 has performed an increment in the workload processing while the workload data is in-flight (e.g., transiting) from the camera 815 to the cloud system 820.

Figure 9:
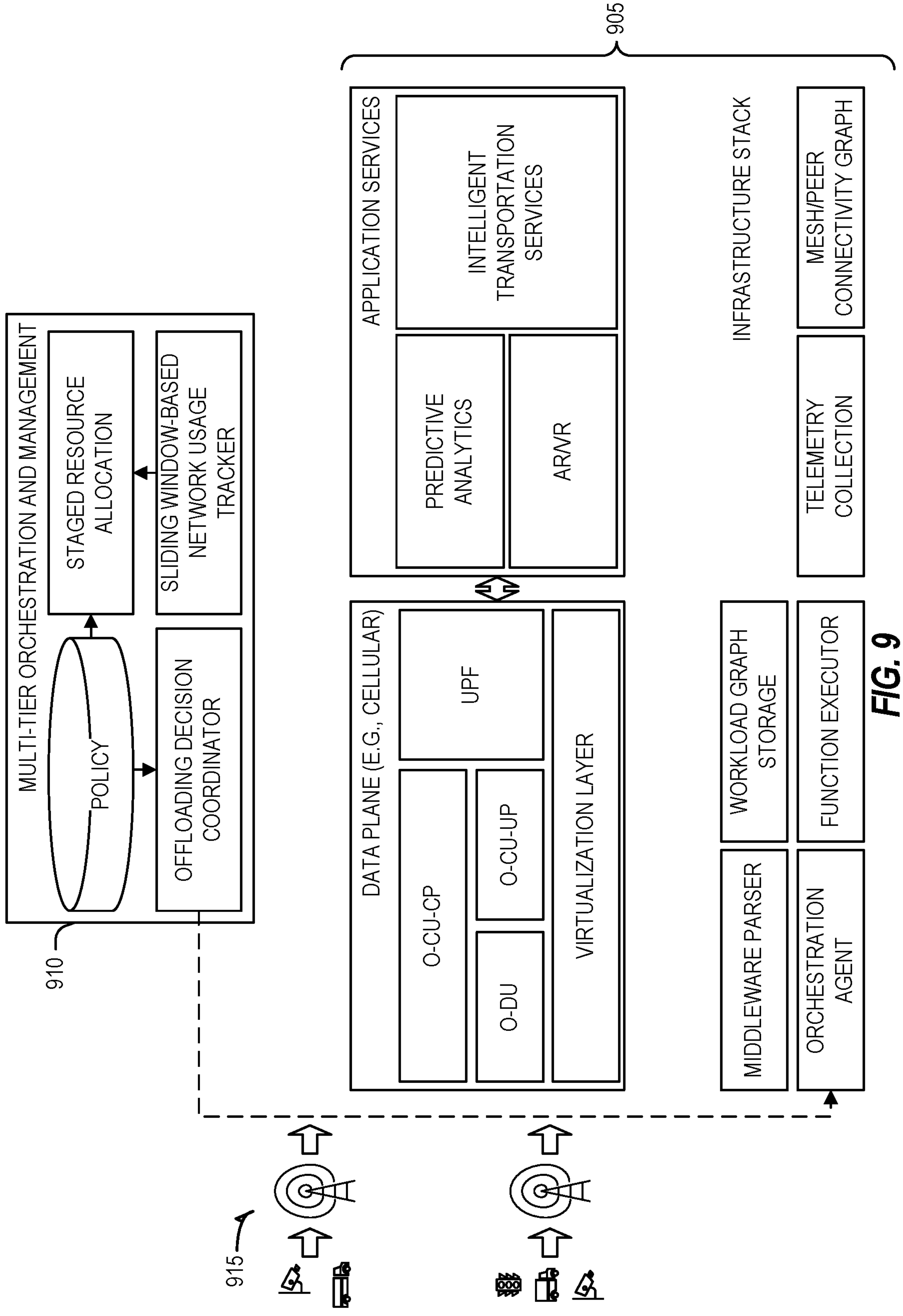
FIG. 9 depicts components for infrastructure offload, according to an example.

FIG. 9 depicts components for infrastructure offload, according to an example. As illustrated, an orchestration system 910 interacts with an IPU 905 to provide in-flight incremental processing from edge devices 915. Within this example, a graph-based workload representation may be used to facilitate the incremental processing of the workload. Here, applications may be represented in terms of a graph connecting modular functions or microservices. An application SLA may be decomposed into SLAs between interdependent functions and embedded into the graph-based representation (e.g., an edge between two functions in a graph may include an annotation with an additional SLA requirement for network connectivity or security).

Figure 10:
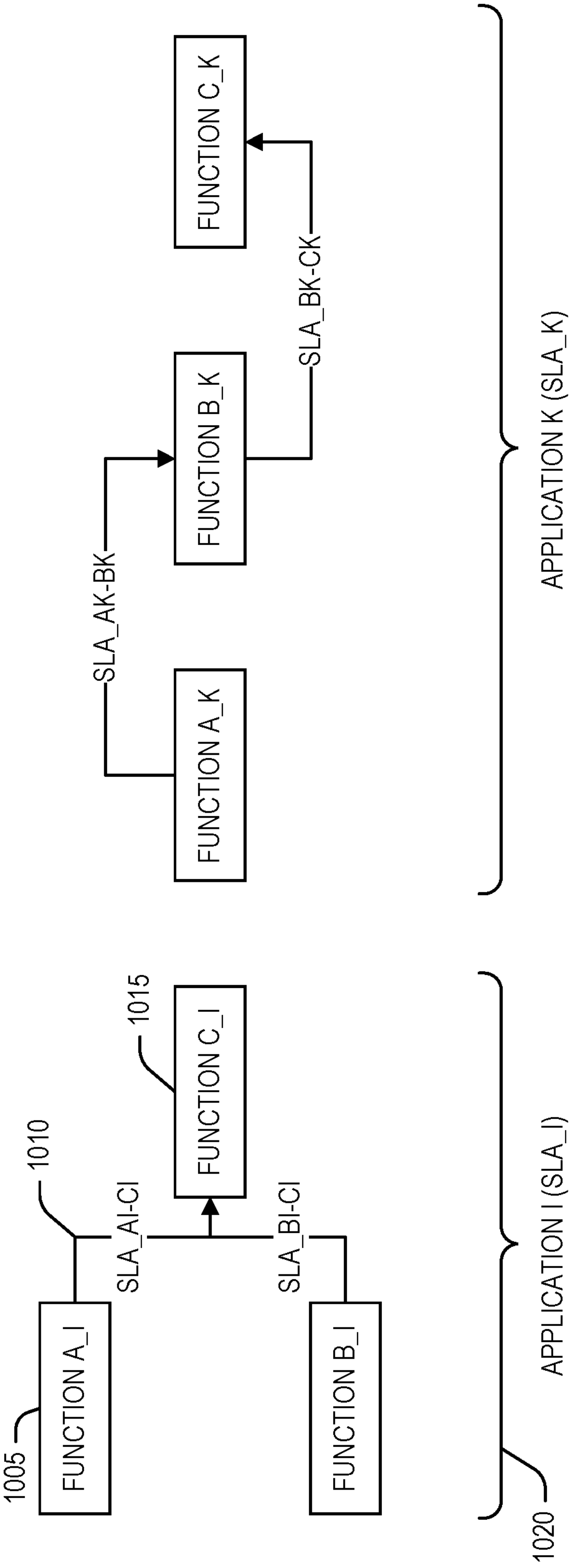
FIG. 10 depicts service level agreements (SLAs) in a workload graph, according to an example.

FIG. 10 illustrates an example of edge-based SLA annotations in the workload graph. Such decomposition may be performed automatically via artificial intelligence or machine learning techniques, or, for example, via explicit or implicit hints from a tenant or other processor.

When workloads are decomposable into primitives (e.g., functions), some of these primitives may be processable by the IPU 905 or other programmable networking elements on the path from the access edge (e.g., far-edge or on-premises edge) to the near-edge or regional cloud. The orchestration system 910 may send control plane messages to the IPU 905 about the increases in traffic (e.g., including sudden increases), enabling the IPU 905 to allocate additional resources (e.g., accelerators, buffers, etc.) for the flows with high priorities. The reserved resources may be used opportunistically. Because IPU 905 resources are generally scarce and primarily allocated for accelerating tasks such as remote procedure calls (RPCs), cryptographic manipulations, encapsulation or decapsulation, etc., such resources may be reserved for workloads (e.g., applications) that have stringent SLA requirements.

The orchestration system 910 may be configured to perform multi-tier orchestration and staged resource allocation. Here, the orchestration system 910 tracks traditional computing resources and network infrastructure computing resources (e.g., the IPU 905 resources) and the health of connectivity among the network infrastructure processing components. In an example, a sliding window-based resource tracker may be used to predict potential demand for network infrastructure resources. In an example, because network infrastructure resources are generally scarce, it may be useful to incrementally draw upon these resources when traffic demand spikes.

In an example, a number of resources may be reserved at the near-edge or the regional cloud to absorb an initial portion of a resource demand curve. Here, the demand may be constrained such that demand increases in steps. The duration of each step may provide the near-edge time to adapt by decommissioning or reducing best-effort jobs. The near edge may also progressively reduce resources set aside for other jobs or tasks whose priorities are below that of the incoming demand from the far-edge.

Once the near-edge has begun to absorb the offloaded tasks from the far-edge, at each operating point, the resource allocation may increase in each unit of time proportionally to the rate at which the traffic needs to increase from the far-edge to the near-edge, so that the near-edge allocation grows fast in anticipation of the demand cliff instead of stabilizing at the current step amplitude. This enables the near edge to use small initial resource reservations to time-shift the process of triaging demand and, keeping the IPU 905 ahead of the next step up in demand.

In an example, the near-edge waits for the far-edge to stabilize after the traffic has begun to taper off, to initiate a sequence of punctuated equilibria in which the original offload is reversed. This prevents small fluctuations in demand at the far-edge from causing oscillations between the reserved (e.g., set-aside) resources in one direction in one time step and the same in the next time step.

The orchestration system 910 may include an offloading decision coordinator that works in concert with an orchestration agent running on the IPU 905 to coordinate the offloading of a function or to determine the right place of execution to meet the SLA requirements.

The IPU 905 may include distributed workload graph storage. With the distributed workload graph storage, the IPU 905 is provided a location where applications may place (e.g., drop, deposit, etc.) a graph of functions (e.g., in the form of a directed acyclic graph of dependent microservices) to be executed. For example, the distributed workload graph storage may be an network storage (e.g., an S3 type of storage) that is mapped into the network infrastructure entities including networking hardware hosting the IPU 905. Applications may write payloads or data to be accessed by the functions into the distributed workload graph storage. The graph, stored into this network infrastructure hardware, may include all the various elements needed to execute the offloaded graph. These elements may include inputs, outputs, functions to be executed, SLA per function, among other things. The distributed workload graph storage may also include other components, such as tenancy, data privacy, etc.

The IPU 905 may include an orchestration agent. The orchestration agent may be configured to receive direction from the orchestration system 910 via the control-plane. The orchestration system 910 may provide high-level directives, such as execute on far-edge or near-edge. Based on the SLA of applications or individual functions, a current status of the network infrastructure resources (e.g., hardware of network devices such as switches, routers, gateways, network cards, IPUs, etc.), or high-level directives from the orchestration system 910, the orchestration agent is configured to determine whether the function in question should be executed locally or on a remote infrastructure component. For non-critical applications, the orchestration agent may exchange additional coordination messages with the orchestration system 910. For critical applications, the orchestration agent may determine to save latency and notify the orchestration system 910.

The IPU 905 may include a function executor. Once the orchestration agent determines that a function will execute locally, the function executor provides a secure run-time environment to instantiate or load the function from the distributed graph storage and execute on the IPU 905.

The IPU 905 may include a telemetry collector. The telemetry collector is configured to collect telemetry about the execution of a function on the IPU 905 and the network connecting a group of infrastructure processing components (e.g., in infrastructure networking devices such as switches, gateways, etc). In an example, a mesh is employed by the telemetry collector to gather some of the telemetry data.

The IPU 905 may include a middleware parser. The middleware parser is configured to leverage some middleware application programming interfaces (APIs) provided by the infrastructure to indicate SLA requirements. For example, when an orchestration agent offloads function processing to a remote infrastructure component, a middleware header may be appended to the application payload. Example middleware header information include criticality of application, criticality of the individual function, encoded SLA requirement in bit-efficient manner, among other things.

FIG. 10 depicts service level agreements (SLAs) in a workload graph, according to an example. The graphs of application I 1020 and application K are illustrated. At the vertices are functions and the edges represent function dependencies and include per-dependency SLAs. Thus, the function A 1005 is connected to function C 1015 in the application I 1020. The SLA 1010 for this connection (e.g., dependency) is specific to the function A→C transition in application I 1020.

Figure 11:
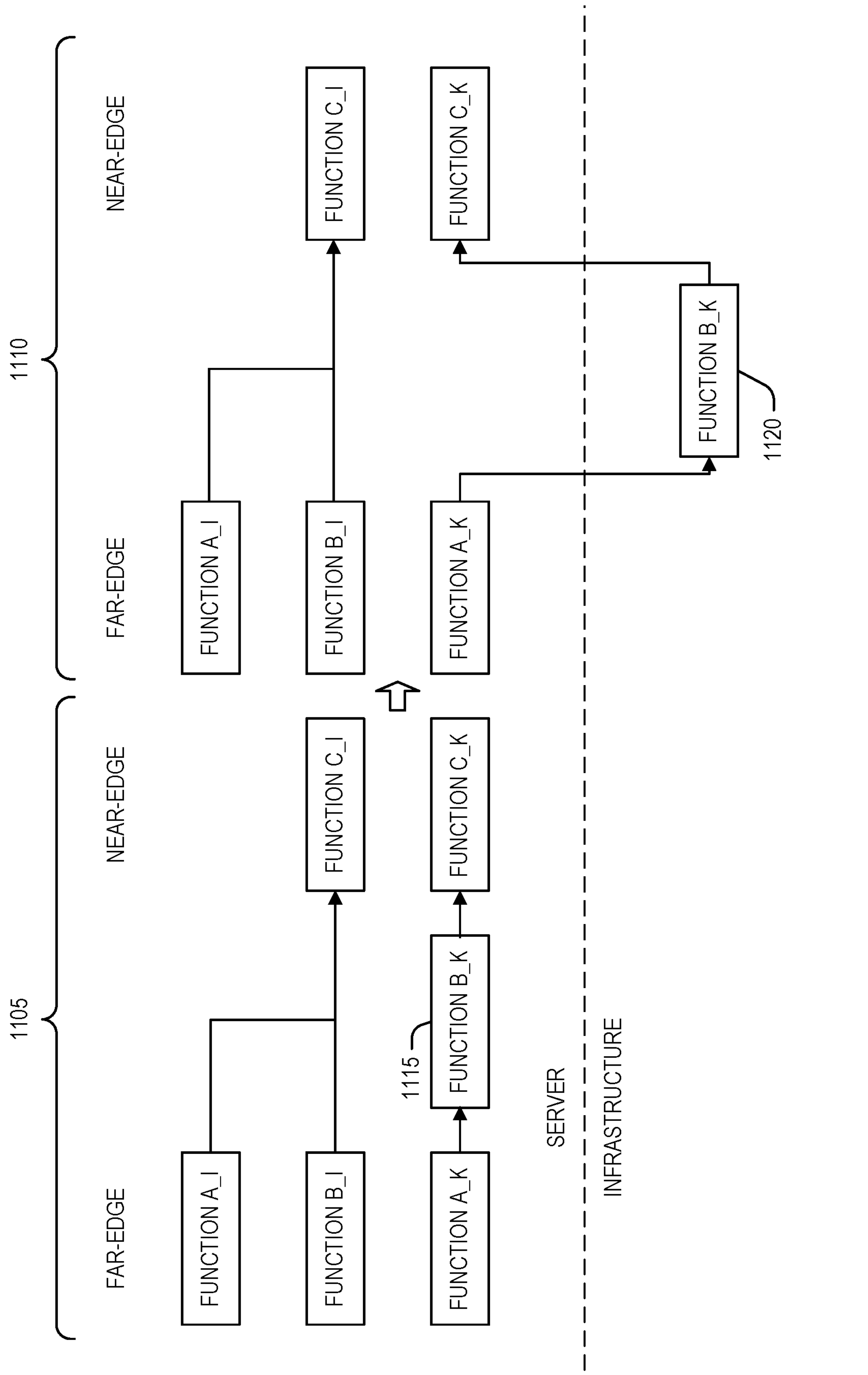
FIG. 11 depicts a graph in which a function is offloaded to infrastructure, according to an example.

FIG. 11 depicts a graph in which a function is offloaded to a network infrastructure device (e.g., a switch including an IPU), according to an example. A first processing pipeline 1105 is illustrated on the left and a second processing pipeline 1110 is illustrated on the right. Both processing pipelines 1105 and 1110 are processing the same workload. However, the processing pipeline 1110 moved the function B of application K 1120 to an IPU. In contrast, the processing pipeline 1105 is executing the function B of application K 1115 in software. Using the IPU 1120 enables the processing pipeline 1110 to avoid using general processing capabilities that are needed by the processing pipeline 1105 to complete the workload.

Figure 12:
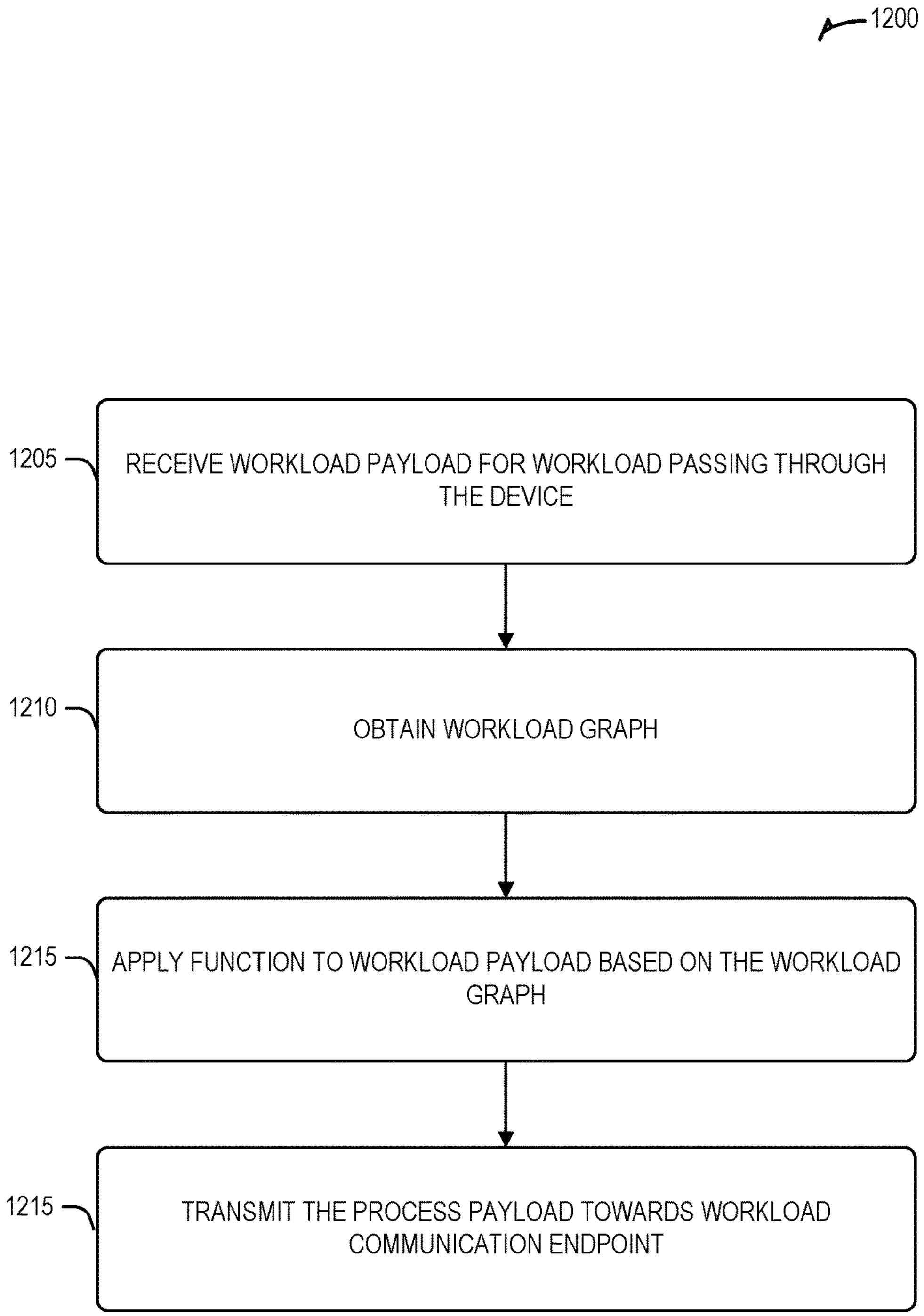
FIG. 12 depicts a method for in-flight incremental processing, according to an example.

FIG. 12 depicts a method 1200 for in-flight incremental processing, according to an example. The operations of the method 1200 are performed by computation hardware, such as that described above (e.g., an IPU, processor, or other circuitry). The method 1200 provides in-flight incremental processing by processing workloads while the data transits from the edge towards a consuming node.

At operation 1205, a payload is received, for example, at a network device. In this case, the payload is part of a workload that is routed through the network device from a first network node to a second network node. In an example, the network device is an IPU. In an example, the IPU is included in a third network node. In an example, the third network node is a switch, router, or a gateway. In an example, the first network node is an edge node.

At operation 1210, a workload graph for the workload is obtained (e.g., retrieved or received). In the case the vertices of the workload graph are functions. In an example, the edges are dependencies between functions. In an example, the workload graph includes SLA data for the workload. In an example, the SLA data includes an SLA on an edge in the workload graph. In an example, the workload graph is one of multiple workload graphs respectively corresponding to multiple workloads. In an example, each workload graph includes SLA data.

In an example, the method 1200 includes the operations of receiving workload process data in a control plane of a network interface upon which the payload is received. In an example, the workload process data includes identification of a vertex in the workload graph to identify the function to apply to the payload. In an example, the workload process data includes a reservation for hardware in the network device to perform the function when the payload arrives to the network device. In an example, the workload process data includes the workload graph. In an example, the workload process data includes a reference to the workload graph. In this example, obtaining the workload graph includes using the reference to the workload graph to retrieve the workload graph.

At operation 1215, a function is applied to the payload in accordance with the workload graph. The function modifies the payload to create a processed payload. In an example, the function is applied to the payload before a second function is applied to a second payload for a second workload based on SLA data in the workload graph and a second workload graph for the second workload.

At operation 1220, the processed payload is transmitted towards the second network node. In an example, transmitting the processed payload toward the second network node includes identification of a next vertex in the workload graph to apply to the processed payload at a subsequent network node.

Use Cases and Additional Examples

An IPU can be hosted in any of the tiers that go from device to cloud. Any compute platform that needs connectivity can potentially include an IPU. Some examples of places where IPUs can be placed are: Vehicles; Far Edge; Data center Edge; Cloud; Smart Cameras; Smart Devices.

Some of the use cases for a distributed IPU may include the following.

1) Service orchestrator (local, shared, remote, or distributed): Power, Workload perf, ambient temp prediction and optimization tuning and service orchestration not just locally but across distributed Edge Cloud
2) Infrastructure offload (for local machine)—same as traditional IPU use-cases to offload network, storage, host virtualization etc. but additional Edge Network Security Edge specific usages, Storage Edge specific usages, Virtualization Edge specific usages
3) IPU as a host to augment compute capacity (using ARM/x86 cores) for running edge specific "functions" on demand, integrated as API/Service or running as K8s worker node for certain types of services, side car proxies, security attestation services, scrubbing traffic for SASE/L7 inspection Firewall, Load balancer/Forward or reverse Proxy, Service Mesh side cars (for each POD running on local host) etc. 5G UPF and other RAN offloads Etc.
4) Trusted Security intermediary for attesting and orchestrating confidential computing enclaves on the host as well as any other connected CXL/PCI-E or interconnected XPU.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a networking infrastructure device for in-flight incremental processing, the networking infrastructure device comprising: a network interface; and processing circuitry that, when in operation, is configured to: receive a payload via the network interface, the payload being part of a workload that is routed through the networking infrastructure device from a first network node to a second network node; obtain a workload graph for the workload, the workload graph having vertices that are functions; apply a function to the payload in accordance with the workload graph, the function modifying the payload to create a processed payload; and transmit the processed payload towards the second network node.

In Example 2, the subject matter of Example 1, wherein the networking infrastructure device is a network processing unit.

In Example 3, the subject matter of Example 2, wherein the network processing unit is included in a third network node.

In Example 4, the subject matter of any of Examples 1-3, wherein the first network node is an edge node.

In Example 5, the subject matter of any of Examples 1-4, wherein the processing circuitry is configured to receive workload process data in a control plane of a network interface upon which the payload is received.

In Example 6, the subject matter of Example 5, wherein the workload process data includes identification of a vertex in the workload graph to identify the function to apply to the payload.

In Example 7, the subject matter of Example 6, wherein, to transmit the processed payload toward the second network node, the processing circuitry is configured to identify a next vertex in the workload graph to apply to the processed payload at a subsequent network node.

In Example 8, the subject matter of any of Examples 5-7, wherein the workload process data includes a reservation for hardware in the networking infrastructure device to perform the function when the payload arrives to the networking infrastructure device.

In Example 9, the subject matter of any of Examples 5-8, wherein the workload process data includes the workload graph.

In Example 10, the subject matter of any of Examples 5-9, wherein the workload process data includes a reference to the workload graph, and wherein, to obtain the workload graph, the processing circuitry is configured to use the reference to the workload graph to retrieve the workload graph.

In Example 11, the subject matter of any of Examples 1-10, wherein the workload graph includes service level agreement (SLA) data for the workload.

In Example 12, the subject matter of Example 11, wherein the SLA data includes an SLA on an edge in the workload graph.

In Example 13, the subject matter of any of Examples 11-12, wherein the workload graph is one of multiple workload graphs respectively corresponding to multiple workloads, each workload graph including SLA data.

In Example 14, the subject matter of Example 13, wherein the function is applied to the payload before a second function is applied to a second payload for a second workload based on SLA data in the workload graph and a second workload graph for the second workload.

Example 15 is a method for in-flight incremental processing, the method comprising: receiving, at a networking infrastructure device, a payload, the payload being part of a workload that is routed through the networking infrastructure device from a first network node to a second network node; obtaining a workload graph for the workload, the workload graph having vertices that are functions; applying a function to the payload in accordance with the workload graph, the function modifying the payload to create a processed payload; and transmitting the processed payload towards the second network node.

In Example 16, the subject matter of Example 15, wherein the networking infrastructure device is a network processing unit.

In Example 17, the subject matter of Example 16, wherein the network processing unit is included in a third network node.

In Example 18, the subject matter of any of Examples 15-17, wherein the first network node is an edge node.

In Example 19, the subject matter of any of Examples 15-18, comprising receiving workload process data in a control plane of a network interface upon which the payload is received.

In Example 20, the subject matter of Example 19, wherein the workload process data includes identification of a vertex in the workload graph to identify the function to apply to the payload.

In Example 21, the subject matter of Example 20, wherein transmitting the processed payload toward the second network node includes identifying a next vertex in the workload graph to apply to the processed payload at a subsequent network node.

In Example 22, the subject matter of any of Examples 19-21, wherein the workload process data includes a reservation for hardware in the networking infrastructure device to perform the function when the payload arrives to the networking infrastructure device.

In Example 23, the subject matter of any of Examples 19-22, wherein the workload process data includes the workload graph.

In Example 24, the subject matter of any of Examples 19-23, wherein the workload process data includes a reference to the workload graph, and wherein obtaining the workload graph includes using the reference to the workload graph to retrieve the workload graph.

In Example 25, the subject matter of any of Examples 15-24, wherein the workload graph includes service level agreement (SLA) data for the workload.

In Example 26, the subject matter of Example 25, wherein the SLA data includes an SLA on an edge in the workload graph.

In Example 27, the subject matter of any of Examples 25-26, wherein the workload graph is one of multiple workload graphs respectively corresponding to multiple workloads, each workload graph including SLA data.

In Example 28, the subject matter of Example 27, wherein the function is applied to the payload before a second function is applied to a second payload for a second workload based on SLA data in the workload graph and a second workload graph for the second workload.

Example 29 is at least one machine readable medium including instructions for in-flight incremental processing, the instructions, when executed by processing circuitry, cause the processing circuitry to perform operations comprising: receiving, at a networking infrastructure device, a payload, the payload being part of a workload that is routed through the networking infrastructure device from a first network node to a second network node; obtaining a workload graph for the workload, the workload graph having vertices that are functions; applying a function to the payload in accordance with the workload graph, the function modifying the payload to create a processed payload; and transmitting the processed payload towards the second network node.

In Example 30, the subject matter of Example 29, wherein the networking infrastructure device is a network processing unit.

In Example 31, the subject matter of Example 30, wherein the network processing unit is included in a third network node.

In Example 32, the subject matter of any of Examples 29-31, wherein the first network node is an edge node.

In Example 33, the subject matter of any of Examples 29-32, wherein the operations comprise receiving workload process data in a control plane of a network interface upon which the payload is received.

In Example 34, the subject matter of Example 33, wherein the workload process data includes identification of a vertex in the workload graph to identify the function to apply to the payload.

In Example 35, the subject matter of Example 34, wherein transmitting the processed payload toward the second network node includes identifying a next vertex in the workload graph to apply to the processed payload at a subsequent network node.

In Example 36, the subject matter of any of Examples 33-35, wherein the workload process data includes a reservation for hardware in the networking infrastructure device to perform the function when the payload arrives to the networking infrastructure device.

In Example 37, the subject matter of any of Examples 33-36, wherein the workload process data includes the workload graph.

In Example 38, the subject matter of any of Examples 33-37, wherein the workload process data includes a reference to the workload graph, and wherein obtaining the workload graph includes using the reference to the workload graph to retrieve the workload graph.

Example 39 is, The at least one machine readable medium of Example 29, wherein the workload graph includes service level agreement (SLA) data for the workload.

In Example 40, the subject matter of Example 39, wherein the SLA data includes an SLA on an edge in the workload graph.

In Example 41, the subject matter of any of Examples 39-40, wherein the workload graph is one of multiple workload graphs respectively corresponding to multiple workloads, each workload graph including SLA data.

In Example 42, the subject matter of Example 41, wherein the function is applied to the payload before a second function is applied to a second payload for a second workload based on SLA data in the workload graph and a second workload graph for the second workload.

Example 43 is a system for in-flight incremental processing, the system comprising: means for receiving, at a networking infrastructure device, a payload, the payload being part of a workload that is routed through the networking infrastructure device from a first network node to a second network node; means for obtaining a workload graph for the workload, the workload graph having vertices that are functions; means for applying a function to the payload in accordance with the workload graph, the function modifying the payload to create a processed payload; and means for transmitting the processed payload towards the second network node.

In Example 44, the subject matter of Example 43, wherein the networking infrastructure device is a network processing unit.

In Example 45, the subject matter of Example 44, wherein the network processing unit is included in a third network node.

In Example 46, the subject matter of any of Examples 43-45, wherein the first network node is an edge node.

In Example 47, the subject matter of any of Examples 43-46, comprising means for receiving workload process data in a control plane of a network interface upon which the payload is received.

In Example 48, the subject matter of Example 47, wherein the workload process data includes identification of a vertex in the workload graph to identify the function to apply to the payload.

In Example 49, the subject matter of Example 48, wherein the means for transmitting the processed payload toward the second network node include means for identifying of a next vertex in the workload graph to apply to the processed payload at a subsequent network node.

In Example 50, the subject matter of any of Examples 47-49, wherein the workload process data includes a reservation for hardware in the networking infrastructure device to perform the function when the payload arrives to the networking infrastructure device.

In Example 51, the subject matter of any of Examples 47-50, wherein the workload process data includes the workload graph.

In Example 52, the subject matter of any of Examples 47-51, wherein the workload process data includes a reference to the workload graph, and wherein the means for obtaining the workload graph include means for using the reference to the workload graph to retrieve the workload graph.

In Example 53, the subject matter of any of Examples 43-52, wherein the workload graph includes service level agreement (SLA) data for the workload.

In Example 54, the subject matter of Example 53, wherein the SLA data includes an SLA on an edge in the workload graph.

In Example 55, the subject matter of any of Examples 53-54, wherein the workload graph is one of multiple workload graphs respectively corresponding to multiple workloads, each workload graph including SLA data.

In Example 56, the subject matter of Example 55, wherein the function is applied to the payload before a second function is applied to a second payload for a second workload based on SLA data in the workload graph and a second workload graph for the second workload.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A networking infrastructure device for in-flight incremental processing, the networking infrastructure device comprising:

a network interface; and processing circuitry that, when in operation, is configured to:

receive a payload via the network interface, the payload being part of a workload that is routed through the networking infrastructure device from a first network node to a second network node;

obtain a workload graph for the workload, the workload graph having vertices that are functions;

apply a function to the payload in accordance with the workload graph, the function modifying the payload to create a processed payload; and transmit the processed payload towards the second network node.

2. The networking infrastructure device of claim 1, wherein the networking infrastructure device is a network processing unit.

3. The networking infrastructure device of claim 2, wherein the network processing unit is included in a third network node.

4. The networking infrastructure device of claim 1, wherein the first network node is an edge node.

5. The networking infrastructure device of claim 1, wherein the processing circuitry is configured to receive workload process data in a control plane of a network interface upon which the payload is received.

6. The networking infrastructure device of claim 5, wherein the workload process data includes identification of a vertex in the workload graph to identify the function to apply to the payload.

7. The networking infrastructure device of claim 6, wherein, to transmit the processed payload toward the second network node, the processing circuitry is configured to identify a next vertex in the workload graph to apply to the processed payload at a subsequent network node.

8. The networking infrastructure device of claim 5, wherein the workload process data includes a reservation for hardware in the networking infrastructure device to perform the function when the payload arrives to the networking infrastructure device.

9. The networking infrastructure device of claim 5, wherein the workload process data includes the workload graph.

10. The networking infrastructure device of claim 5, wherein the workload process data includes a reference to the workload graph, and wherein, to obtain the workload graph, the processing circuitry is configured to use the reference to the workload graph to retrieve the workload graph.

11. The networking infrastructure device of claim 1, wherein the workload graph includes service level agreement (SLA) data for the workload.

12. The networking infrastructure device of claim 11, wherein the SLA data includes an SLA on an edge in the workload graph.

13. The networking infrastructure device of claim 11, wherein the workload graph is one of multiple workload graphs respectively corresponding to multiple workloads, each workload graph including SLA data.

14. The networking infrastructure device of claim 13, wherein the function is applied to the payload before a second function is applied to a second payload for a second workload based on SLA data in the workload graph and a second workload graph for the second workload.

15. At least one non-transitory machine readable medium including instructions for in-flight incremental processing, the instructions, when executed by processing circuitry, cause the processing circuitry to perform operations comprising:

receiving, at a networking infrastructure device, a payload, the payload being part of a workload that is routed through the networking infrastructure device from a first network node to a second network node;

obtaining a workload graph for the workload, the workload graph having vertices that are functions;

applying a function to the payload in accordance with the workload graph, the function modifying the payload to create a processed payload; and transmitting the processed payload towards the second network node.

16. The at least one non-transitory machine readable medium of claim 15, wherein the operations comprise receiving workload process data in a control plane of a network interface upon which the payload is received.

17. The at least one non-transitory machine readable medium of claim 16, wherein the workload process data includes identification of a vertex in the workload graph to identify the function to apply to the payload.

18. The at least one non-transitory machine readable medium of claim 17, wherein transmitting the processed payload toward the second network node includes identifying a next vertex in the workload graph to apply to the processed payload at a subsequent network node.

19. The at least one non-transitory machine readable medium of claim 16, wherein the workload process data includes a reservation for hardware in the networking infrastructure device to perform the function when the payload arrives to the networking infrastructure device.

20. The at least one non-transitory machine readable medium of claim 16, wherein the workload process data includes a reference to the workload graph, and wherein obtaining the workload graph includes using the reference to the workload graph to retrieve the workload graph.

* * * * *